United States Patent [19]

Ogawa et al.

[11] Patent Number: 5,068,725
[45] Date of Patent: Nov. 26, 1991

[54] BAND COMPRESSING/RESTORING APPARATUS

[75] Inventors: Yoshihiko Ogawa; Seijiro Yasuki, both of Yokohama; Kiyoyuki Kawai, Yokosuka, all of Japan

[73] Assignee: Kabushiki Kaisha Toshiba, Kawasaki, Japan

[21] Appl. No.: 470,219

[22] Filed: Jan. 25, 1990

[30] Foreign Application Priority Data

Feb. 28, 1989 [JP] Japan .................................. 1-45249

[51] Int. Cl.⁵ .......................... H04N 7/12; H04N 7/18
[52] U.S. Cl. .................................. 358/135; 368/136; 368/105
[58] Field of Search ................ 358/105, 133, 135, 136

[56] References Cited

U.S. PATENT DOCUMENTS 4,546,386 10/1985 Matsumoto et al. ................ 358/136
4,924,305 5/1990 Nakagawa et al. ................. 358/105
4,984,077 1/1991 Uchida ............................... 358/136

Primary Examiner—John K. Peng
Attorney, Agent, or Firm—Oblon, Spivak, McClelland, Maier & Neustadt

[57] ABSTRACT

In a band compression apparatus, an input signal is separated into high- and low-frequency components H and L by an LPF and an adder. The component H is in-frame-averaged by an in-frame average circuit. The component L is output as a signal $S_3$ having a large energy via a field delay circuit and a switch circuit. An in-frame difference of the low-frequency component L is obtained by a field delay circuit and an adder. This in-frame differential signal $S_2$ is added to an in-frame average signal $S_1$ by an adder. A signal $S_4$ having a small energy is obtained by this addition. In a band restoration apparatus the signals $S_3$ and $S_4$ are separated into signals of two fields by an adder and a switch circuit. A signal $S_5$ consisting of the components L and H is obtained in one field. A signal $S_2$ consisting of only the component L is obtained in the other field. The signal $S_5$ is output via a switch circuit. The signal $S_2$ is added to the signal $S_5$ in an immediately preceding field by an adder. A signal $S_6$ consisting of the components L and H is obtained by this addition. The signal $S_6$ is output via the switch circuit at a timing delayed by one field with respect to the signal $S_5$.

9 Claims, 18 Drawing Sheets

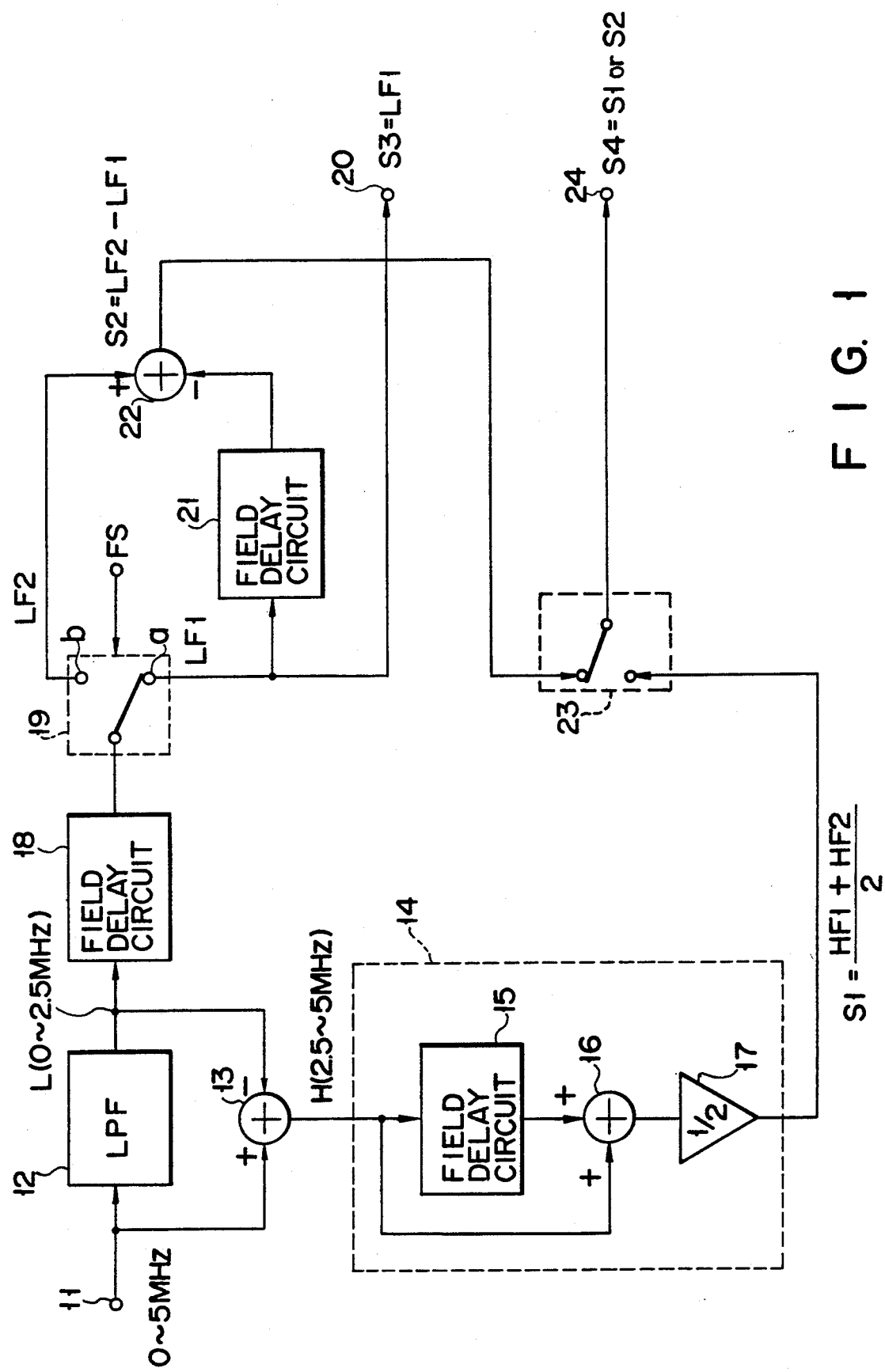
F I G. 1

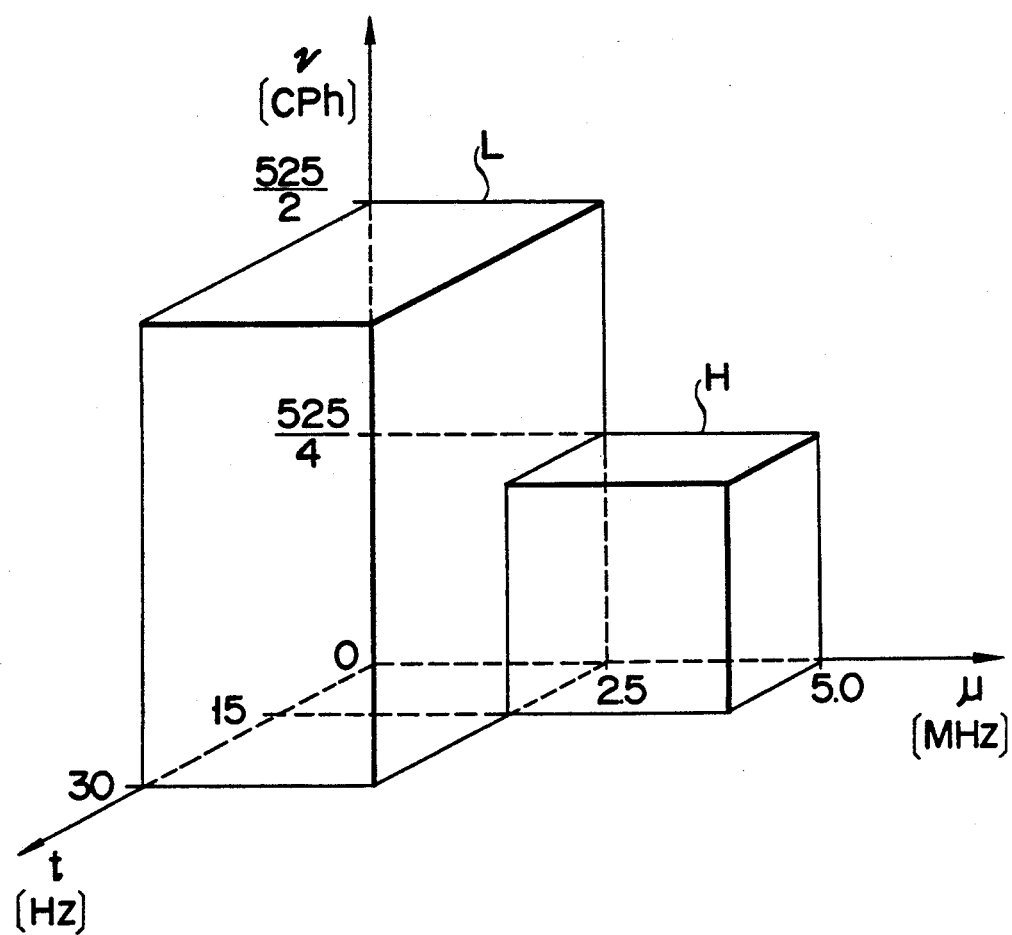
F I G. 4

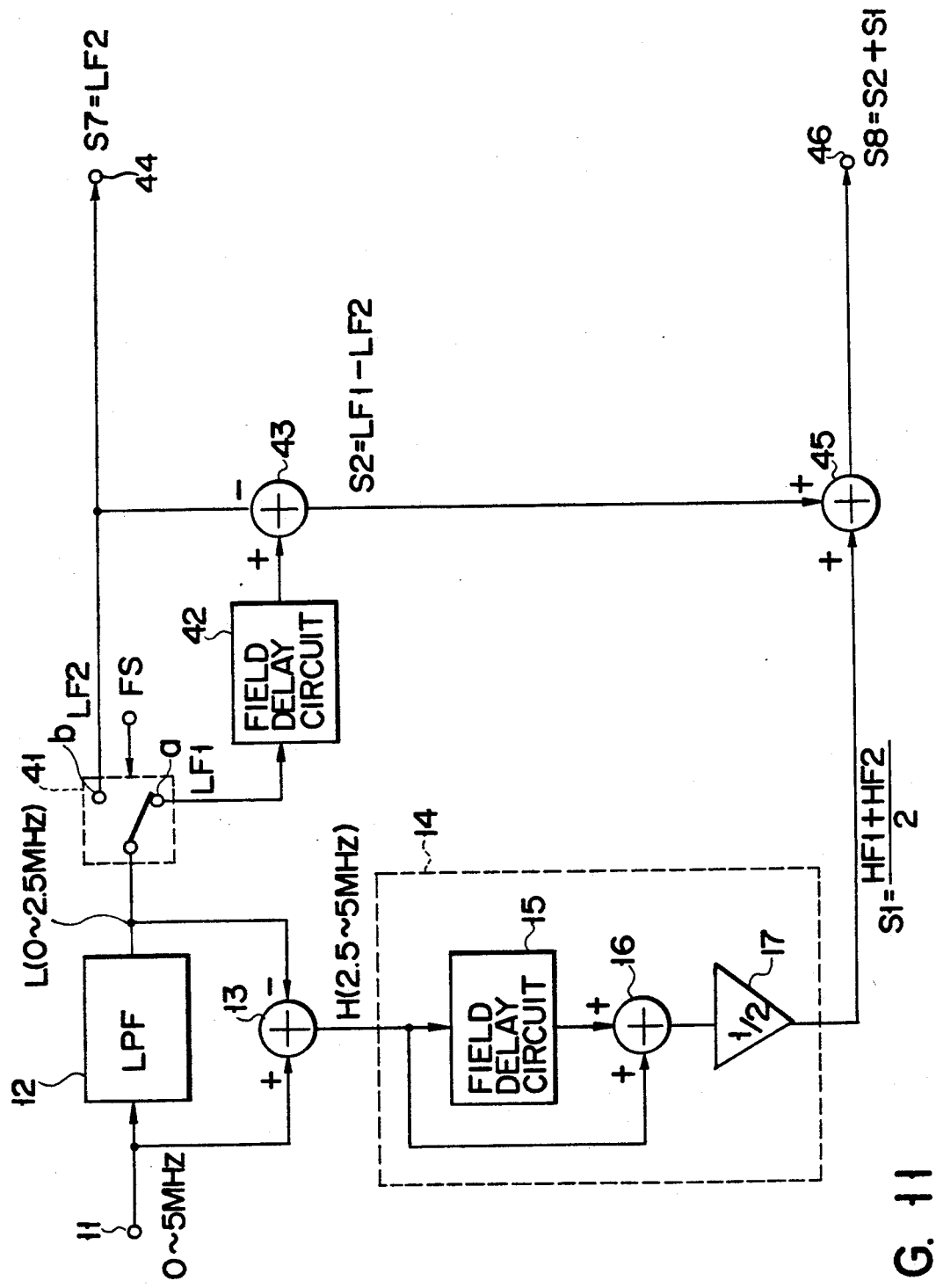
F I G. 11

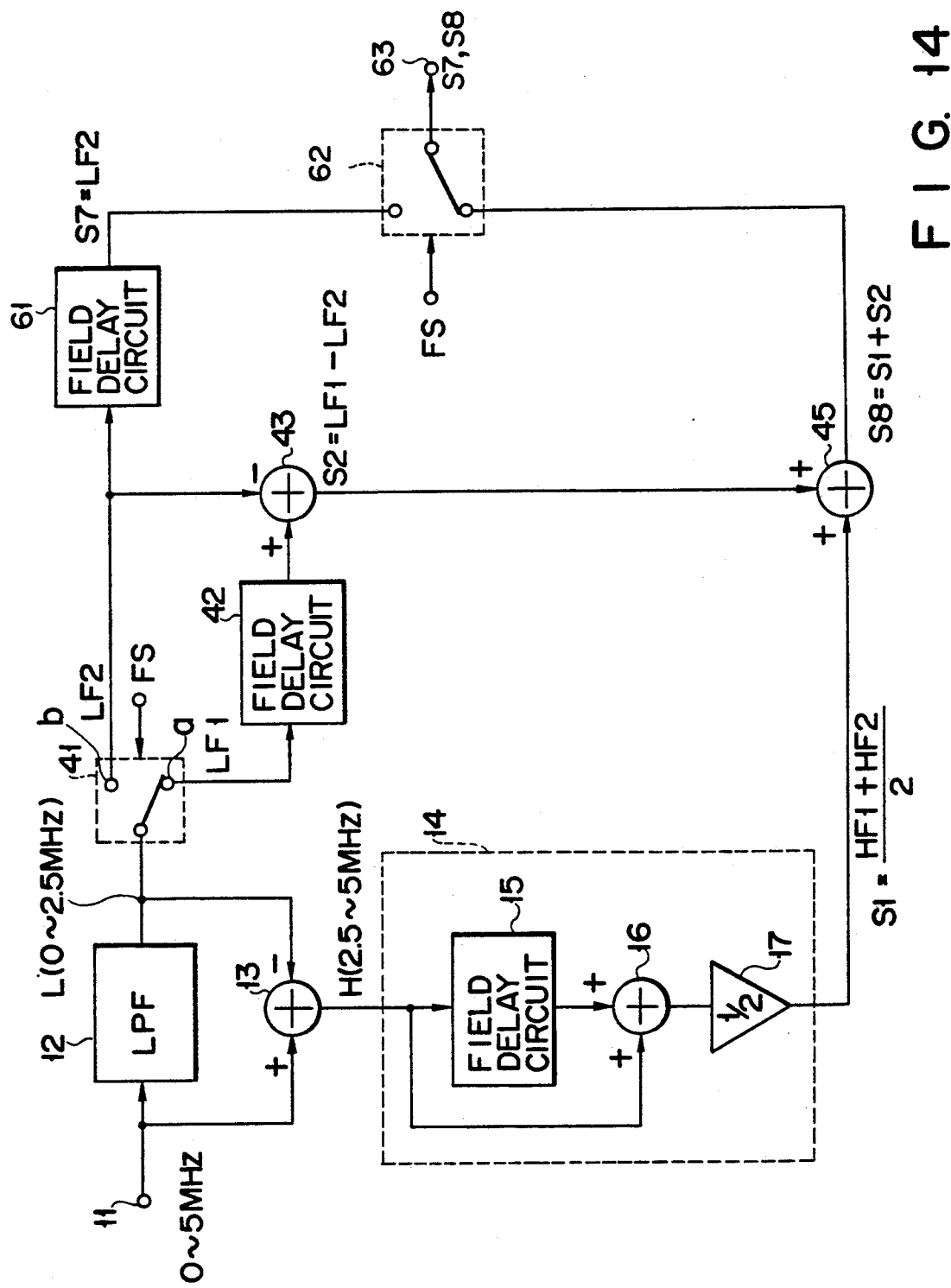
F I G. 14

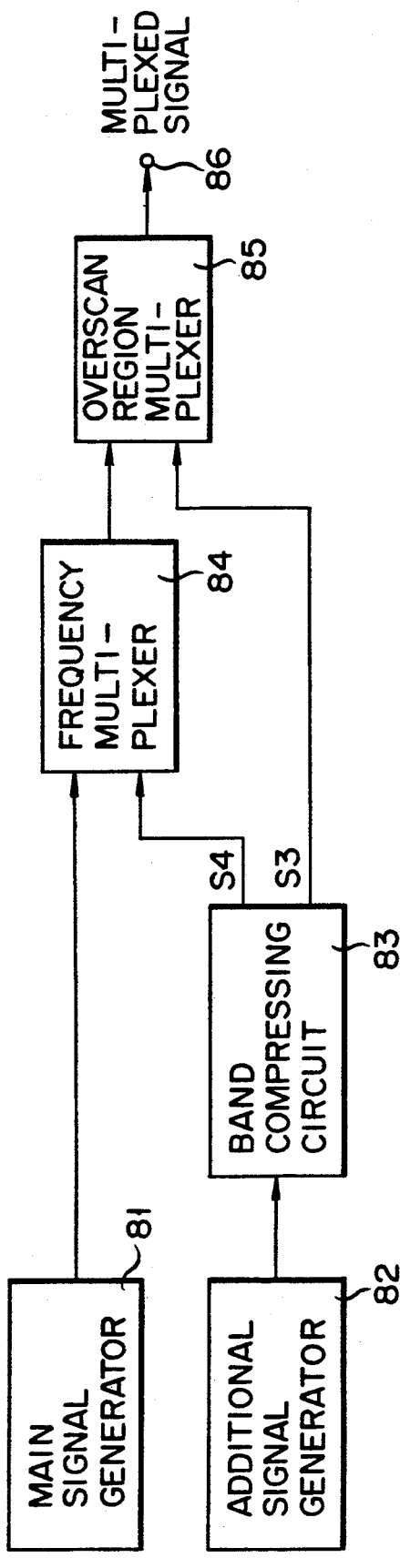
F I G. 16
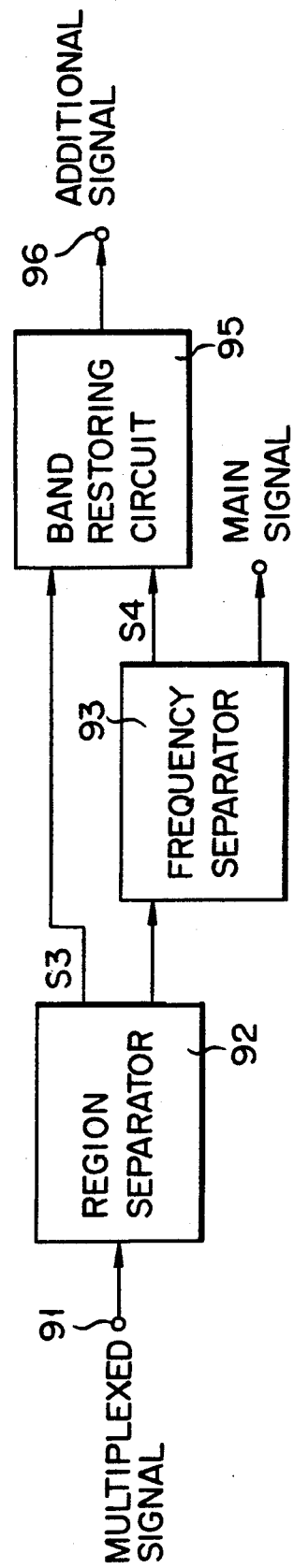
F I G. 17

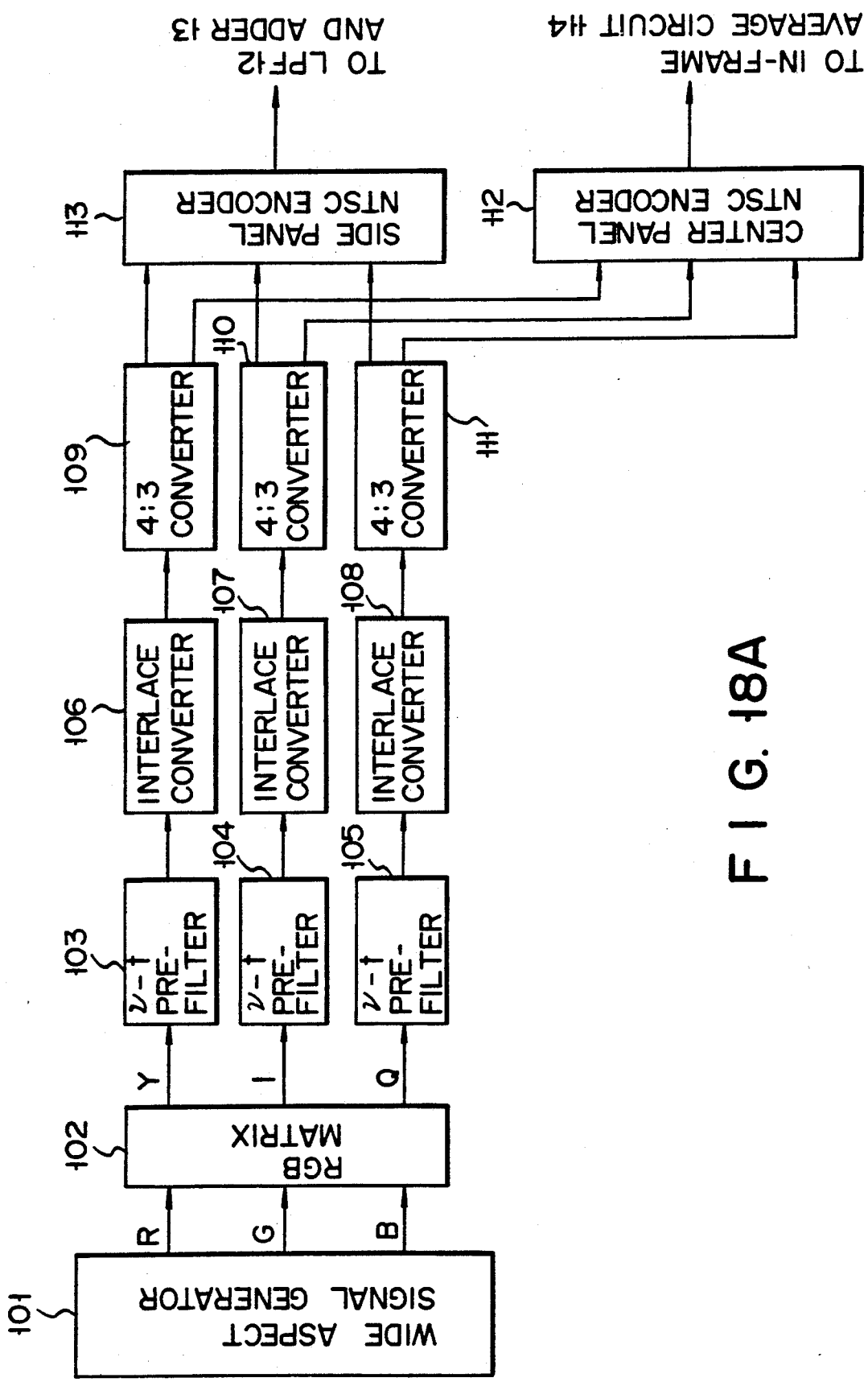
F I G. 18A

BAND COMPRESSING/RESTORING APPARATUS

BACKGROUND OF THE INVENTION

1. Field of the Invention

The present invention relates to a band compressing/restoring apparatus for performing band compression and band restoration of a television signal.

2. Description of the Related Art

An NTSC system is one of color television broadcasting systems. This NTSC system has compatibility with a black/white television broadcasting system and sufficient performance as a color television broadcasting system as may be seen from its successful operations in, e.g., Japan and the United States.

In a long history of the NTSC system, its image quality has been improved from than that obtained in the initial stage of the system by constant efforts made at both the transmission and reception sides.

In recent years, however, as use of a large-screen display has become widespread, further improvements in the image quality are desired for the NTSC system.

An example of an image quality improving system for the NTSC system is an IDTV (Improved Definition Television) system. In this IDTV system, a transmitted color television signal of the NTSC system (to be referred to as an NTSC signal hereinafter) is perfectly utilized at a reception side to improve the image quality. The IDTV system, which has never been employed with conventional analog processing techniques, is realized by recent progresses in digital processing techniques.

According to the IDTV system, the image quality can be improved from than that obtained by the conventional analog processing.

Since, however, the IDTV system is based on the NTSC system, the upper limit of an improvement in image quality is defined by the standards of the NTSC system.

These limitations are, for examples, as follows:
(1) Aspect ratio of screen; and
(2) Horizontal resolution.

In a current NTSC system, the an aspect ratio in item (1) is 4:3. Therefore, an aspect ratio of the IDTV system is limited to 4:3.

Recently, however, it is confirmed that a ratio of 5:3 or 16:9 is desired by users ("Broadcasting System", edited by Nippon Hoso Kyokai, P. 80). For example, an aspect ratio of 16:9 may eventually be adopted in a high definition television system (CCIR Report 801-2).

In addition, in the current NTSC system, a horizontal resolution in item (2) is 330 Tv. This is because a horizontal transmission band of the current NTSC system is defined to be 4.2 MHz. Therefore, a horizontal resolution of the IDTV system is limited to 330 Tv.

Since, however, the number of effective scanning lines is 480, a current vertical resolution can be set to 450 Tv including a margin such as overscan. Therefore, the horizontal resolution must be increased to obtain a good balance with the vertical resolution.

For this reason, a system capable of improving the above two limitations is desired. In addition, this new broadcasting system is desired to have compatibility with the current NTSC system. This is because the new broadcasting system is assumed to be used together with the current NTSC system for the foreseeable future.

In order to maintain the compatibility with the current NTSC system, a system may be arranged such that a current NTSC signal is used as a main signal and information for an image quality improvement, such as a wide aspect or high precision, is multiplexed as an additional signal.

An example of such a multiplexing system is an SLSC system described in Joseph L. LoCicero, "A Compatible High-Definition Television System (SLSC) with Chrominance and Aspect Ratio Improvements", SWPTE Journal, May 1985.

In this SLSC system, a band of two channels is prepared for one station. That is, a signal basically similar to a current NTSC signal is transmitted through one channel, and the additional signal for an image quality improvement is transmitted through the other.

According to this multiplexing system, the additional signal can be multiplexed without interfering with the main signal.

In this system, however, since two channels are used for one station, channel use efficiency is low. Therefore, in an environment in which channel assignment has almost reached its limit, as in Japan, it is difficult to carry out this system. In addition, in order to perform intra- or inter-station transmission, all of the television broadcasting apparatuses must be replaced with new ones since no current television broadcasting apparatus has a band reaching 10 MHz which as is defined by the SLSC system.

For this reason, a system in which an additional signal can be multiplexed within a band of one channel is desired. In addition, this multiplex operation is desired to be performed within 4.2 MHz as a base band in order to maintain the compatibility with current television broadcasting apparatuses such as a video tape recorder and a transmitter.

An example of a system capable of multiplexing an additional signal within 4.2 MHz as a base band is described in T. Fukinuki et., "Extended Definition TV Fully Compatible with Existing Standards", IEEE Tr. on Communication, Vol. COM-32, No. 8, August 1984.

In this multiplexing system, a spectral region which is not used in the case of a still image is used to multiplex an additional signal (a brightness detail component having a horizontal band of about 4 to 6 MHz) for increasing the horizontal resolution of an NTSC signal. In this case, predetermined regions of the first and third quadrants in two-dimensional spectral display in vertical and time directions are used as a multiplexing region.

According to this multiplexing system, the horizontal resolution of a still image can be increased.

This system, however, cannot increase the horizontal resolution of a motion image. This is because a main signal and an addition signal of a motion image cannot be separated from each other at a reception side since a spectrum of the motion image is expanded in the time direction. Therefore, this system cannot be applied to multiplexing of an additional signal for obtaining a wide aspect. That is, since an improvement in horizontal resolution is effective especially for a still image, no problem is posed although the system can multiplex an additional signal of only a still image. An additional signal for obtaining a wide aspect, however, is required for both still and motion images. Therefore, this multiplexing system capable of transmitting additional information for only a still image cannot be adopted since a wide aspect cannot be obtained for a motion image.

For this reason, a demand has arisen for a system capable of multiplexing an additional signal within a base band for not only a still image but also a motion image.

An example of such a multiplexing system is described in, e.g., M.A. Isnardi, et., "Encoding for Compatibility in the ACTV System", IEEE Trans. on Broadcasting Vol. BC-33, No. 4, 1987, PP. 116 to 123.

In this ACTV system, band compression is performed for main and additional signals to enable multiplexing of the additional signal for both still and motion images.

In the ACTV system, however, a band in the vertical and time directions of each of the main and additional signals is largely limited. Therefore, the motion of a reproduced image becomes unnatural, or its vertical resolution is degraded.

These problems will be described below by taking a main signal as an example.

In the ACTV system, an in-frame average of components higher than 1.5 MHz (horizontal frequency) of the main signal is calculated and output by field-repetition.

Therefore, in the case of a still image (i.e., when a time frequency is 0 Hz), a vertical upper-limit frequency of components higher than 1.5 MHz (horizontal frequency) of the main signal is limited to 525/4 [cph] which is half that of the NTSC system. Therefore, in the case of a still image, a vertical resolution of the components higher than 1.5 MHz, i.e., an oblique resolution is degraded. As a result, a blurred still image is obtained.

In the case of a motion image, as in the case of a still image, a vertical band is limited to half that of the NTSC system. Therefore, a vertical frequency becomes 0 [cph] at a portion in which a time frequency is 15 Hz. As a result, since only motion components up to 15 Hz can be transmitted, smoothness of the motion is largely degraded.

As described above, the ACTV system has a problem of unnaturalness of a motion or a decrease in vertical resolution.

Attention must be paid to this ACTV system, however, since the system can multiplex an additional signal of even a motion image by adopting a band compressing technique. Therefore, a demand has arisen for a band compressing technique not causing the unnaturalness of a motion or a decrease in vertical resolution as a drawback of the ACTV system.

In addition, when an additional signal is to be multiplexed with a main signal, a visual interference of the additional signal with respect to the main signal poses another problem. Therefore, a band-compressed output of an additional signal is desired not to visually interfere with a main signal.

SUMMARY OF THE INVENTION

It is an object of the present invention to provide a band compressing/restoring apparatus capable of band-compressing a television signal without causing unnaturalness of a motion or degradation in vertical resolution.

It is another object of the present invention to provide a band compressing/restoring apparatus capable of obtaining a band-compressed output of an additional signal visually not interfering with a main signal.

In order to achieve the above objects, according to the present invention, at a band compression side, a first television signal of a 2:1 interlace format is band-compressed so that second and third television signals are output on the basis of the first television signal. The second television signal consists of a low-frequency component of one field of the first television signal. The third television signal consists of an in-frame differential signal of a low-frequency component of the first television signal and a high-frequency component of at least one field of the first television signal.

At a band restoration side, the first television signal is restored such that on the basis of the second and third television signals, a fifth television signal is output in one field and a sixth television signal is output in the other field. The fifth television signal consists of the second signal and high-frequency component of the third television signal. The sixth television signal consists of a low-frequency component of the other field of the first television signal and a high-frequency component of the third television signal.

With the above arrangement, band compression can be performed without causing unnaturalness of a motion.

This is because a low-frequency component required to obtain smoothness of the motion remains the same. That is, a low-frequency component of each field of the first television signal is directly restored without being subjected to any band limitation.

In addition, band compression can be performed without decreasing a vertical resolution.

This is because a low-frequency component is not subjected to any band limitation.

When the present invention is applied to band compression of an additional signal, a band-compressed output visually not interfering with main signal can be obtained.

The reason for this is as follows.

That is, in order to multiplex an additional signal with a main signal, processing may be performed such that a part of the additional signal is frequency-multiplexed with the main signal in an image display region and then the remaining part is multiplexed with the main signal in an overscan region since the band limitation and the like are present. In this multiplexing method, no problem is posed even if the energy of the additional signal is large in the overscan region. In an image display region, however, an interference of the additional signal appears on a screen if the energy of the additional signal is large. Therefore, the energy of the additional signal is desired to be small in the image display region.

As for the second and third television signals as the band-compressed outputs of the present invention, the energy of the former is large, while that of the latter is small. Therefore, by multiplexing the former in the overscan region and multiplexing the latter in the image display region, the visual interference of the additional signal with respect to the main signal can be eliminated.

BRIEF DESCRIPTION OF THE DRAWINGS

FIG. 1 is a circuit diagram showing an arrangement of a compression side of the first embodiment of a band compressing/restoring apparatus according to the present invention;

FIG. 4 is a diagram showing a three-dimensional spectrum for explaining the operation of the arrangements in FIGS. 1 and 2;

FIG. 11 is a circuit diagram showing an arrangement of the second embodiment of a band compressing/restoring apparatus according to the present invention;

FIG. 14 is a circuit diagram showing an arrangement of a compression side of the third embodiment of a band compressing/restoring apparatus according to the present invention;

FIG. 16 is a circuit diagram showing an arrangement of a multiplexing side of an embodiment of an additional signal multiplexing/restoring apparatus according to the present invention;

FIG. 17 is a circuit diagram showing an arrangement of a restoring side of the embodiment of the additional signal multiplexing/restoring apparatus according to the present invention;

FIGS. 18A and 18B are circuit diagrams showing a detailed arrangement of FIG. 16;

DETAILED DESCRIPTION OF THE PREFERRED EMBODIMENTS

Embodiments of the present invention will be described in detail below with reference to the accompanying drawings.

FIG. 1 is a circuit diagram showing an arrangement of a compressing side of the first embodiment of a band compressing/restoring apparatus according to the present invention. Similarly, FIG. 2 is a circuit diagram showing an arrangement of a restoring side of the apparatus.

Figure 2:
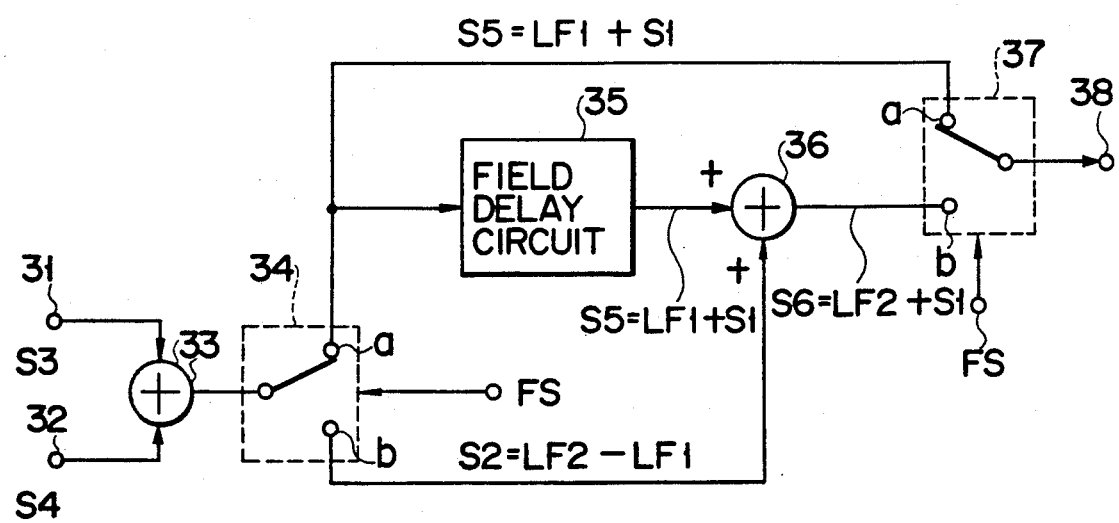
FIG. 2 is a circuit diagram showing an arrangement of a restoration side of the first embodiment of the band compressing/restoring apparatus according to the present invention.

Before the arrangement of the apparatus shown in FIGS. 1 and 2 is described, an operation of this apparatus will be briefly described below with reference to FIGS. 3A and 3B.

In the following description, assume that a television signal is a 2:1 interlace format wide aspect signal having an aspect ratio of 5:3.

This wide aspect signal has a horizontal transmission band of 5 MHz so that the wide aspect signal has the same horizontal resolution as that of a current NTSC signal. This is represented by the following equation:

$$4 \text{ MHz} \times (5/3)/(4/3) = 5 \text{ MHz}$$

Figure 3A:
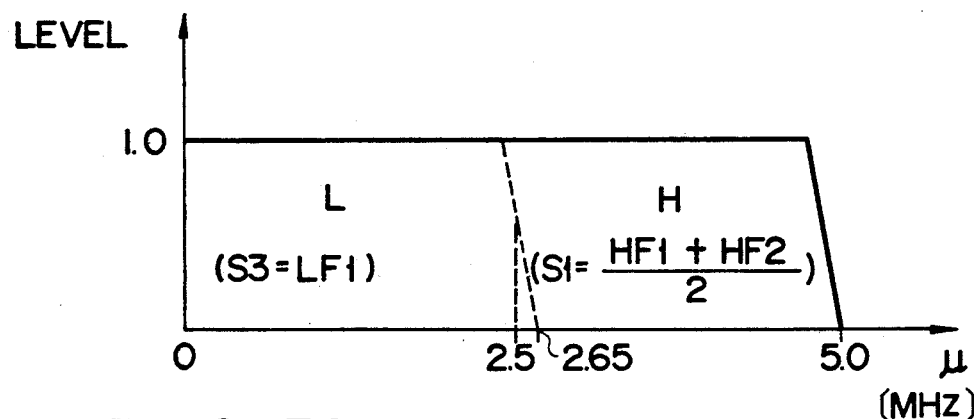
FIGS. 3A and 3B are graphs showing frequency characteristics for explaining an operation of the arrangements in FIGS. 1 and 2.

FIG. 3A is a graph showing frequency characteristics of a signal of a first field of a band-compressed wide aspect signal. Similarly, FIG. 3B is a graph showing frequency characteristics of a signal of a second field.

Figure 3B:
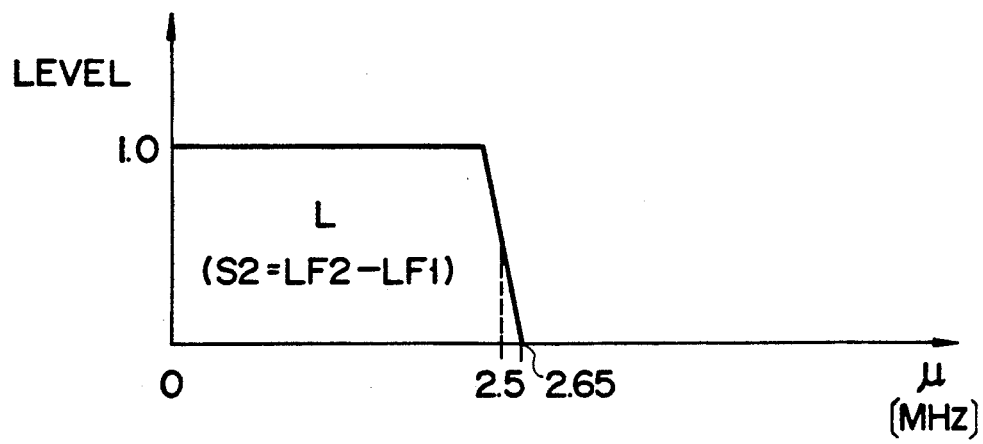

In FIGS. 3A and 3B, the abscissa represents a horizontal frequency ($\mu$), and the ordinate represents a an amplitude level.

Reference symbol L represents a horizontal low-frequency component, and reference symbol H represents a horizontal high-frequency component.

Reference symbols $F_1$ and $F_2$ represent the first and second fields, respectively, of the wide aspect signal before band compression. Therefore, reference symbols $LF_1$ and $LF_2$ represent low-frequency components of the first and second fields $F_1$ and $F_2$, respectively, of the wide aspect signal before band compression. Similarly, reference symbols $HF_1$ and $HF_2$ represent high-frequency components of the first and second fields $F_1$ and $F_2$, respectively.

Note that the upper-limit frequency of the low-frequency component L is set to be, e.g., 2.5 MHz.

The band compressing apparatus shown in FIG. 1 outputs the low- and high-frequency components L and H in the first field, and outputs only the low-frequency component L in the second field, thereby band-compressing an input signal.

The low-frequency component L of the first field consists of the low-frequency component $LF_1$ of the first field $F_1$ of the input signal. The high-frequency component H consists of an in-frame average signal $S_1$ of the high-frequency components $HF_1$ and $HF_1$ of the first and second fields $F_1$ and $F_2$, respectively, of the input signal. This in-frame average signal $S_1$ is given by the following equation (1):

$$S_1 = (HF_1 + HF_2)/2 \tag{1}$$

The low-frequency component L of the second field consists of an in-frame differential signal $S_2$ of the low-frequency components $LF_1$ and $LF_2$ of the first and second fields $F_1$ and $F_2$, respectively, of the input signal. This in-frame differential signal $S_2$ is given by the following equation (2):

$$S_2 = LF_1 - LF_2 \tag{2}$$

The band compressing apparatus shown in FIG. 1 separately outputs the band-compressed output as two signals $S_3$ and $S_4$ represented by the following equations (3) and (4), respectively. As is apparent from equation (3), the signal $S_3$ consists of the low-frequency component $LF_1$. As is apparent from equation (4), the signal $S_4$ consists of the in-frame differential signal $S_2$ and the in-frame average signal $S_1$:

$$S_3 = LF_1 \tag{3}$$

$$S_4 = S_2 \text{ or } S_1 \tag{4}$$

FIG. 4 is a diagram showing a three dimensional spectrum of the band-compressed wide aspect signal.

Referring to FIG. 4, $\nu$ represents a vertical frequency, and t represents a time frequency.

As shown in FIG. 4, the low-frequency component L is not band-limited in either the vertical or time direction. This is because the low-frequency components $LF_1$ and $LF_2$ of the first and second fields $F_1$ and $F_2$ before band compression are directly output as the low-frequency components L of the first and second fields after band compression, respectively.

The high-frequency component H is band-limited to half in both the vertical and time directions. This is because the high-frequency component H is output in only the first field due to band compression.

In this manner, the wide aspect signal is band-compressed to 0.625 the original band.

The band restoring apparatus shown in FIG. 2 band-restores the signals $S_3$ and $S_4$, thereby outputting a signal $S_5$ in the first field and a signal $S_6$ in the second field.

As is apparent from the following equation (5), the signal $S_5$ consists of the low-frequency component $LF_1$ ($S_3$) and the in-frame average signal $S_1$. As is apparent from the following equation (6), the signal $S_6$ consists of the low-frequency component $LF_2$ and the in-frame average signal $S_1$:

$$S_5 = LF_1 = S_1 \quad (5)$$

$$S_6 = LF_2 + S_1 \quad (6)$$

In this manner, an original band of the wide aspect signal is restored.

Band compression and band restoration of this embodiment are as briefly described above.

The arrangement of the apparatus shown in FIGS. 1 and 2 will be described below.

The arrangement of the band compressing apparatus shown in FIG. 1 will be described first.

Figure 5:
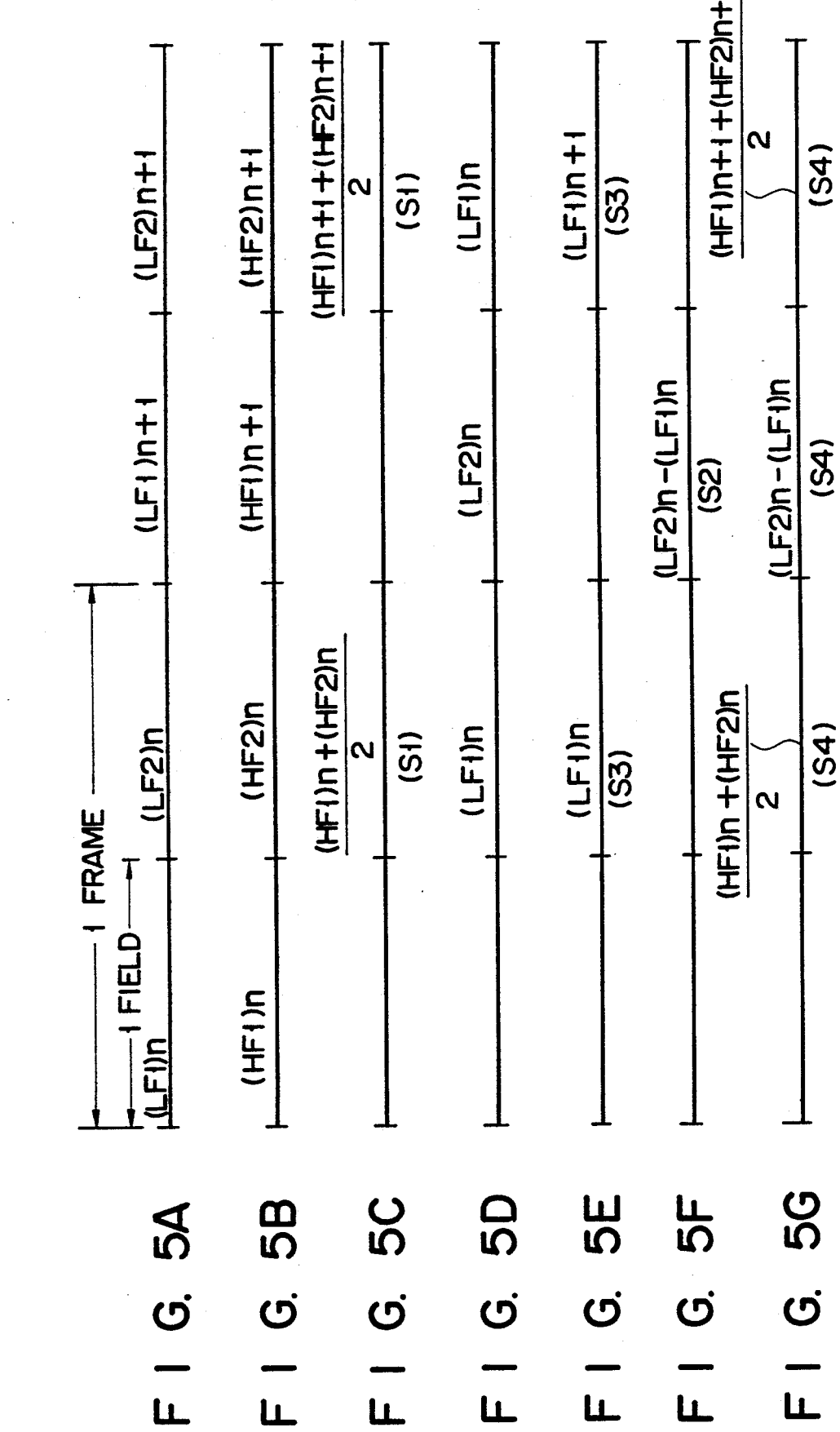
FIGS. 5A to 5G and 6A to 6D are timing charts for explaining the operation of the arrangement in FIG. 1.

Referring to FIG. 1, reference numeral 11 denotes an input terminal for receiving a wide aspect signal before band compression. This aspect signal is supplied to a low-pass filter (to be referred to as an LPF hereinafter) 12 having a horizontal upper-limit frequency of 2.5 MHz, and a low-frequency component L of 0 to 2.5 MHz is extracted therefrom. An extracted output of the low-frequency component L is shown in FIG. 5A. Referring to FIG. 5A, n represents an nth frame, and n+1 represents an (n+1)th frame.

The low-frequency component L extracted by the LPF 12 is subtracted by an adder 13 from the wide aspect signal supplied to the input terminal 11. As a result, a high-frequency component H having a horizontal band of 2.5 to 5 MHz is obtained. This high-frequency component H is shown in FIG. 5B.

The high-frequency component H output from the adder 13 is in-frame-averaged by an in-frame average circuit 14. That is, the output from the adder 13 is delayed by one field (1/60 sec) by a field delay circuit 15. This delayed output is then added to the high-frequency component H after one field by an adder 16. Finally, this addition output is multiplied by ½ by a coefficient circuit 17. In this manner, as shown in FIG. 5C, an in-frame average signal $S_1$ (see equation (1)) is obtained every other field from the coefficient circuit 17.

As shown in FIG. 5D, the low-frequency component L output from the LPF 12 is delayed by one field by a field delay circuit 18. This circuit 18 is inserted in synchronism with a timing at which the high-frequency component H is delayed by one field by the field delay circuit 15.

An output from the field delay circuit 18 is supplied to a switch circuit 19. The circuit 19 is connected to a terminal a in a field in which a low-frequency component $LF_1$ is output from the field delay circuit 18. As a result, the low-frequency component $LF_1$ is supplied to an output terminal 20 and a field delay circuit 21 via the switch circuit 19. The low-frequency signal $LF_1$ supplied to the output terminal 20 is used as a signal $S_3$. This signal $S_3$ is shown in FIG. 5E. The low-frequency component $LF_1$ supplied to the field delay circuit 21 is delayed by one field.

The switch circuit 19 is connected to a terminal b in a field in which a low-frequency component $LF_2$ is output from the field delay circuit 18. As a result, the low-frequency component $LF_2$ is supplied to an adder 22 via the switch circuit 19. The adder 22 subtracts the low-frequency component $LF_1$ delayed by one field by the field delay circuit 21 from the low-frequency component $LF_2$. As a result, an in-frame differential signal $S_2$ is obtained. This signal $S_2$ is shown in FIG. 5F.

The in-frame differential signal $S_2$ and the in-frame average signal $S_1$ are supplied to selector 23. This selector is output as a signal $S_4$ from an output terminal 24.

The signal $S_4$ is shown in FIG. 5G. As shown in FIG. 5G, in the signal $S_4'$ the in-frame average signal $S_1$ and the in-frame differential signal $S_2$ alternately appear in units of fields. In this case, the in-frame average signal $S_1$ is output in the same field as the low-frequency component $LF_1$ (signal $S_3$) shown in FIG. 5E.

Note that the connection state of the switch circuit 19 is controlled on the basis of field switching signal FS.

An arrangement of the band restoring apparatus shown in FIG. 2 will be described below.

Figure 6:
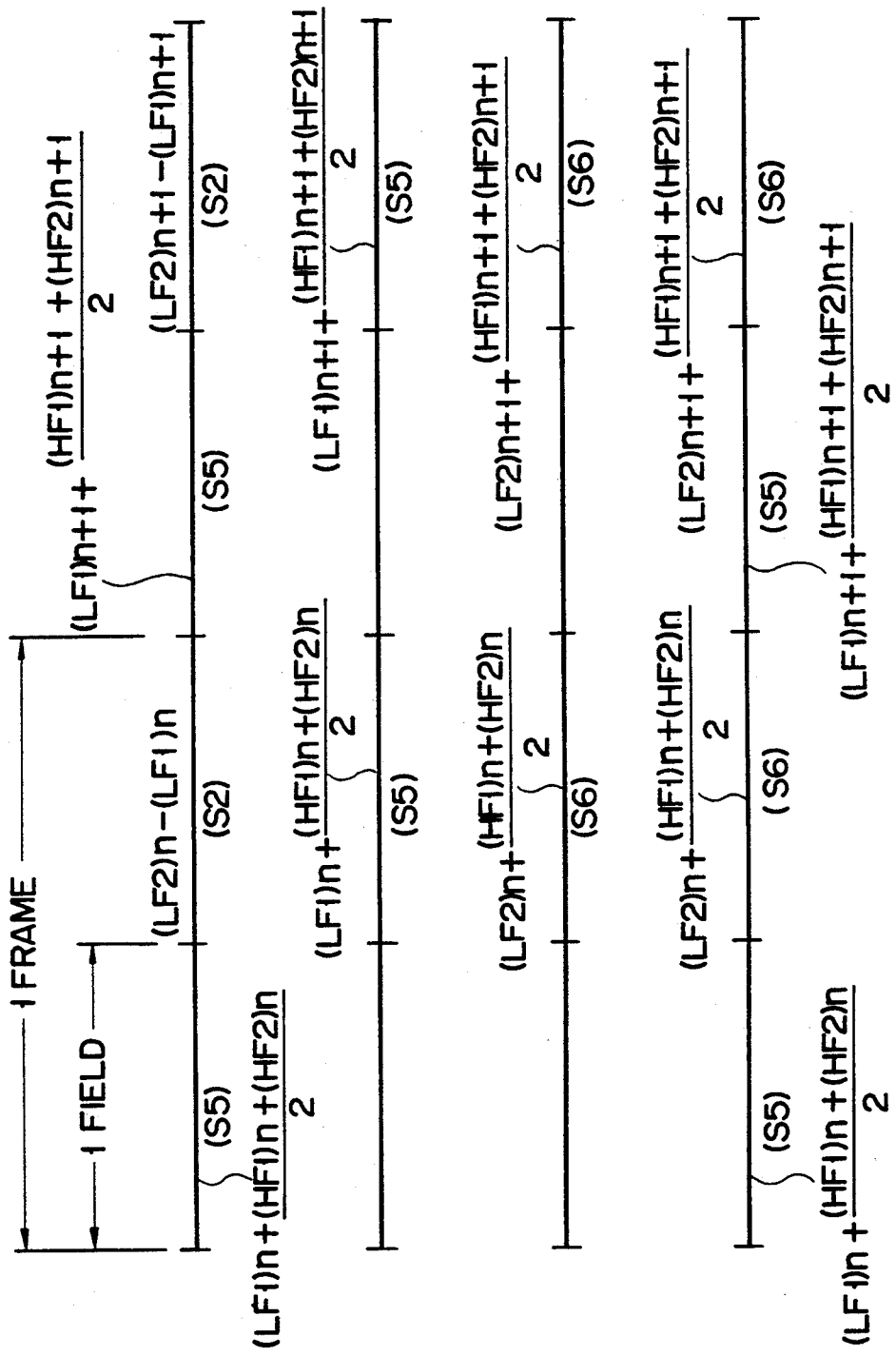

Referring to FIG. 2, reference numerals 31 and 32 denote input terminals for receiving the signals $S_3$ and $S_4$, respectively. The signals $S_3$ and $S_4$ are added to each other by an adder 33. In this manner, the signals $S_3$ and $S_4$ are supplied onto a single signal line. In this case, a signal $S_5$ consisting of the low-frequency component $LF_1$ (signal $S_3$) and the in-frame average signal $S_1$ appears in the first field on this signal line. In the second field, the in-frame differential signal $S_2$ appears. An output from the adder 33 is shown in FIG. 6A.

The output from the adder 33 is supplied to a switch circuit 34. The circuit 34 is connected to a terminal a in the first field. As a result, the signal $S_5$ of the first field is supplied to a field delay circuit 35 and a terminal a of a switch circuit 37 via the switch circuit 34.

The field delay circuit 35 delays the television signal $S_5$ by one field. This delayed output is shown in FIG. 6B.

The switch circuit 37 is connected to a terminal a in the first field. As a result, the signal $S_5$ is supplied to an output terminal 38 via the circuit 37.

The switch circuit 34 is connected to a terminal b in the second field. As a result, the in-frame average signal $S_2$ is supplied to an adder 36. The adder 36 adds the signal $S_2$ to the signal $S_5$ output from the field delay circuit 35. In this manner, a signal $S_6$ consisting of the low-frequency component $LF_2$ and the in-frame average signal $S_1$ is obtained from the adder 36. An output from the adder 36 is shown in FIG. 6C.

The output from the adder 36 is supplied to the switch circuit 37. The circuit 37 is connected to a terminal b in the second field. As a result, the signal $S_6$ is supplied to the output terminal 38 via the switch circuit 37.

Output timings of the signals $S_5$ and $S_6$ at the terminal 38 are shown in FIG. 6D.

The connection states of the switch circuits 34 and 37 are also controlled on the basis of the field switching signal FS.

The following effects can be obtained by the above embodiment.

(1) Band compression of the wide aspect signal can be performed without causing unnaturalness in a motion.

This is because the low-frequency components $LF_1$ and $LF_2$ required to obtain smoothness of the motion remain unaffected. That is, the components $LF_1$ and $LF_2$ are not band-limited at all but perfectly restored.

Therefore, since all of motion components up to a time frequency of 30 Hz are reproduced, no unnaturalness is caused in the motion.

It is confirmed by an experiment that smoothness is obtained in a motion when the upper-limit frequency of the low-frequency component L is set to be 2.5 MHz.

This will be described with reference to FIG. 7.

Figure 7:
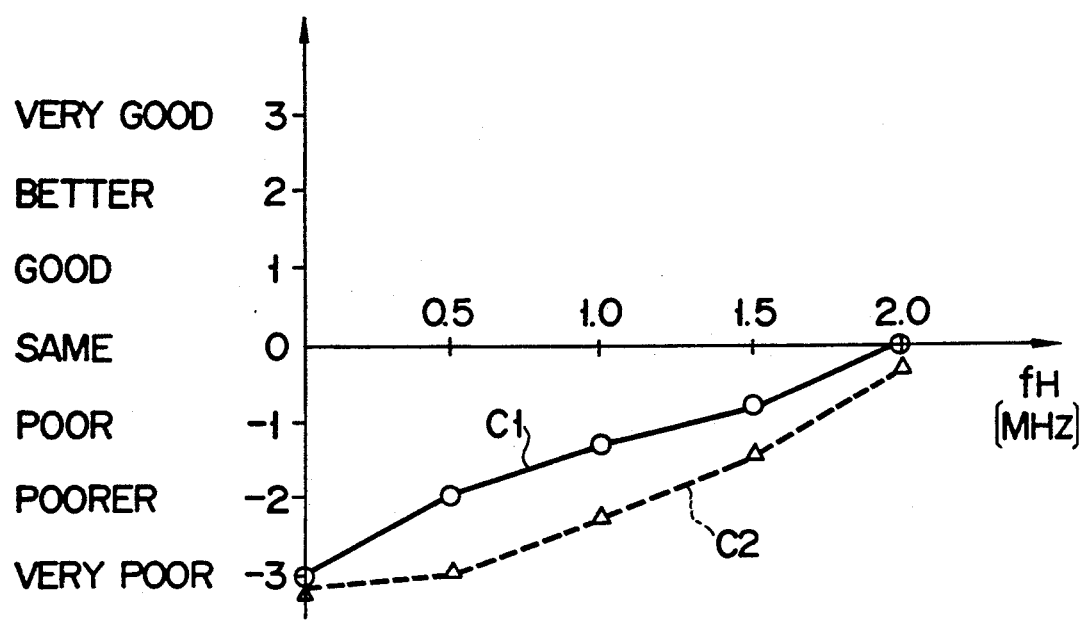
FIG. 7 is a graph for explaining an effect of the arrangements in FIGS. 1 and 2.

FIG. 7 shows experiment results obtained when unnaturalness of a motion is visually evaluated while the upper-limit frequency of the low-frequency component L is changed.

Referring to FIG. 7, the abscissa represents an upper-limit frequency $f_H$ of the low-frequency component L, and the ordinate represents an evaluation category. This evaluation category is a 7-step relative evaluation category from "very poor" to "very good". A characteristic curve C1 represents an evaluation result obtained when the high-frequency component H is restored by field repetition of the in-frame average signal $S_1$ in the above embodiment. A characteristic curve C2 represents an evaluation result obtained when the high-frequency component H is restored by field repetition of a high-frequency component H in one field. Note that a characteristic curve obtained when the high-frequency component is not band-limited coincides with the abscissa.

As is apparent from FIG. 7, as the upper-limit frequency $f_H$ of the low-frequency component L, i.e., the lower-limit frequency of the band-limited high-frequency component H is increased, unnaturalness of a motion disappears. When, the upper-limit frequency $f_H$ is increased up to 2.0 MHz, completely the same result as obtained when the high-frequency component H is not band-limited is obtained. Therefore, according to an arrangement in which the upper-limit frequency $f_H$ of the low-frequency component L is set to be 2.5 MHz which is higher than 2.0 MHz as in the above embodiment, the low-frequency component L required to obtain smoothness of a motion can be maintained.

(2) The wide aspect signal can be band-compressed without decreasing the vertical resolution.

This is because the low-frequency components $LF_1$ and $LF_2$ are not band-limited at all in the vertical direction.

(3) When the present invention is applied to band compression of an additional signal, a band-compressed output can be obtained without visually interfering with a main signal.

The reason for this is as follows.

When an additional signal is to be multiplexed with a main signal, processing may be performed such that a part of the additional signal is frequency-multiplexed with the main signal in an image display region and the remaining part is multiplexed with the main signal in an overscan region, since restrictions such as a band limitation are present. In such a multiplexing method, no problem is posed even if an energy of the additional signal is large in the overscan region. In the image display region, however, an interference of the additional signal appears on a screen if the energy of the additional signal is large. Therefore, the energy of the additional signal is desired to be small in the image display region.

As for the signals $S_3$ and $S_4$ as the band-compressed outputs, an energy of the former is large, and that of the latter is small. Therefore, by multiplexing the former in the overscan region and multiplexing the latter in the image display region, a visual interference of the addition signal with respect to the main signal can be eliminated.

Figure 8:
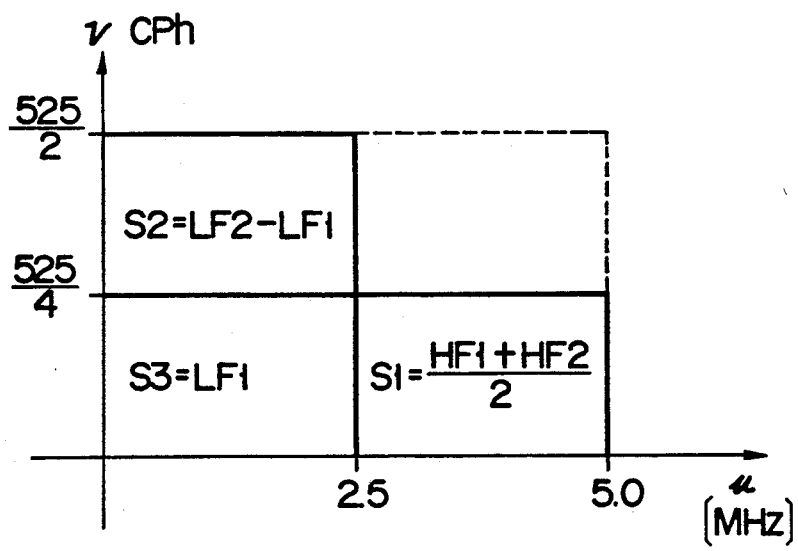
FIG. 8 is a diagram showing a two-dimensional spectrum for explaining the effect of the arrangements in FIGS. 1 and 2.

An energy of the signal $S_4$ is small because it consists of the in-frame average signal $S_1$ and the in-frame differential signal $S_2$ each having a small energy. The energy of the in-frame average signal $S_1$ is small because it is located in a horizontal high-frequency region as shown in FIG. 8. The energy of the in-frame differential signal $S_2$ is small because it is located in a vertical high-frequency region shown in FIG. 8.

The energies of the signals $S_2$ and $S_3$ located in a horizontal low-frequency region will be compared below.

A two-dimensional autocorrelation function of image is represented by the following equation (7) (Fukinuki Takahiko, "Image Digital Signal Processing"):

$$\phi(\xi,\eta)=\phi(0,0)\exp(-\alpha|\xi|-\beta|\xi|) \quad (7)$$

Figure 9:
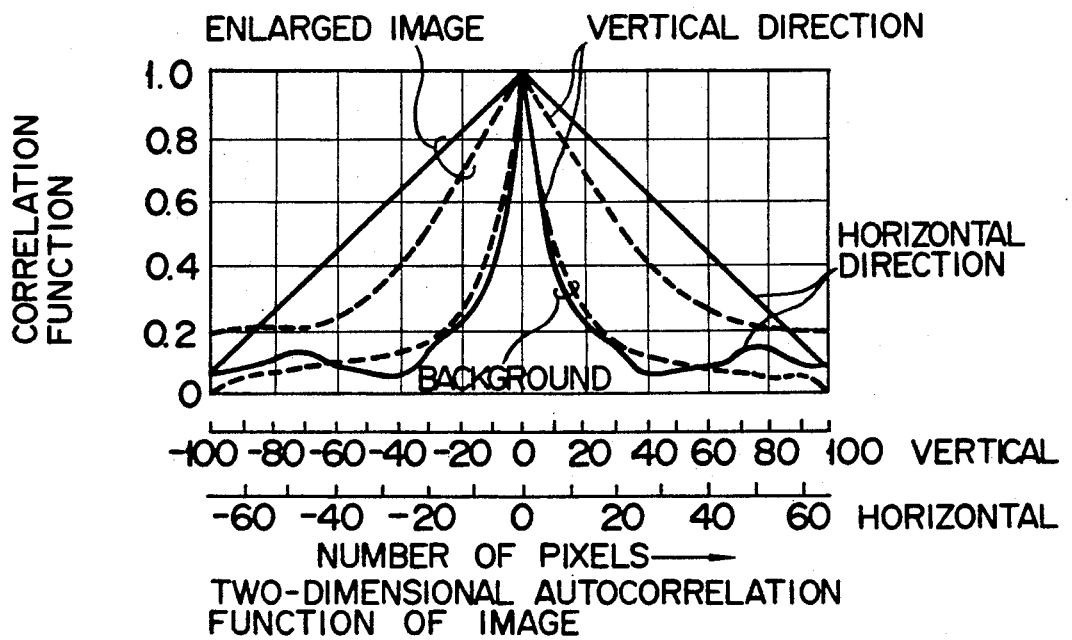
FIGS. 9, 10A, and 10B are graphs for explaining the effect of the arrangements in FIGS. 1 and 2.

This is shown in FIG. 9. According to a Wiener-Khintchine's theorem, a two-dimensional power spectrum and a two-dimensional autocorrelation function have a relationship of a Fourier transform. In addition, since the signals $S_2$ and $S_3$ have the same horizontal band, i.e., only their vertical bands are different, the autocorrelation function can be considered to b one-dimensional. This is represented by the following equation (8):

$$f(t)=\exp(-a|t|) \quad (8)$$

Equation (8) can be Fourier-transformed into the following equation (9):

$$F(\omega)=2a/(a^2+\omega^2) \quad (9)$$

Figure 10A:
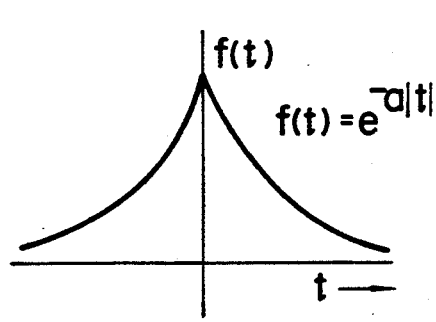

This is shown in FIG. 10A (see Rassy, "Communication System"). Therefore, the power spectrum is represented as in FIG. 10B.

Figure 10B:
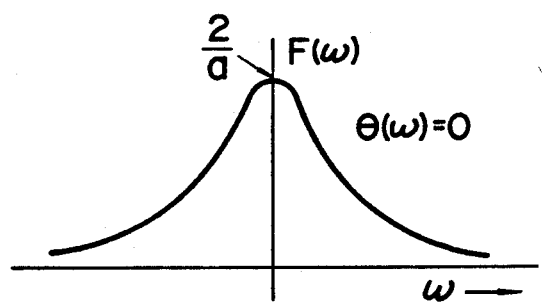

As shown in FIG. 10B, as the frequency is increased, the energy is decreased at high rate. Therefore, the energy of the signal $S_2$ located in the vertical high-frequency region is much smaller than that of the signal $S_3$ located in the low-frequency region.

(4) A reproduced image can be protected from being doubled at a horizontal edge portion.

This is because the in-frame average signal $S_1$ is used as the high-frequency component H. That is, with this arrangement, a horizontal high-frequency motion component not affecting smoothness of the motion is restricted.

(5) The present invention can be effectively applied to analog transmission.

This is because analog processing is performed in all operations. As a result, the present invention can cope with a communication in which reception performance is easily degraded as in ground broadcasting.

Figure 12:
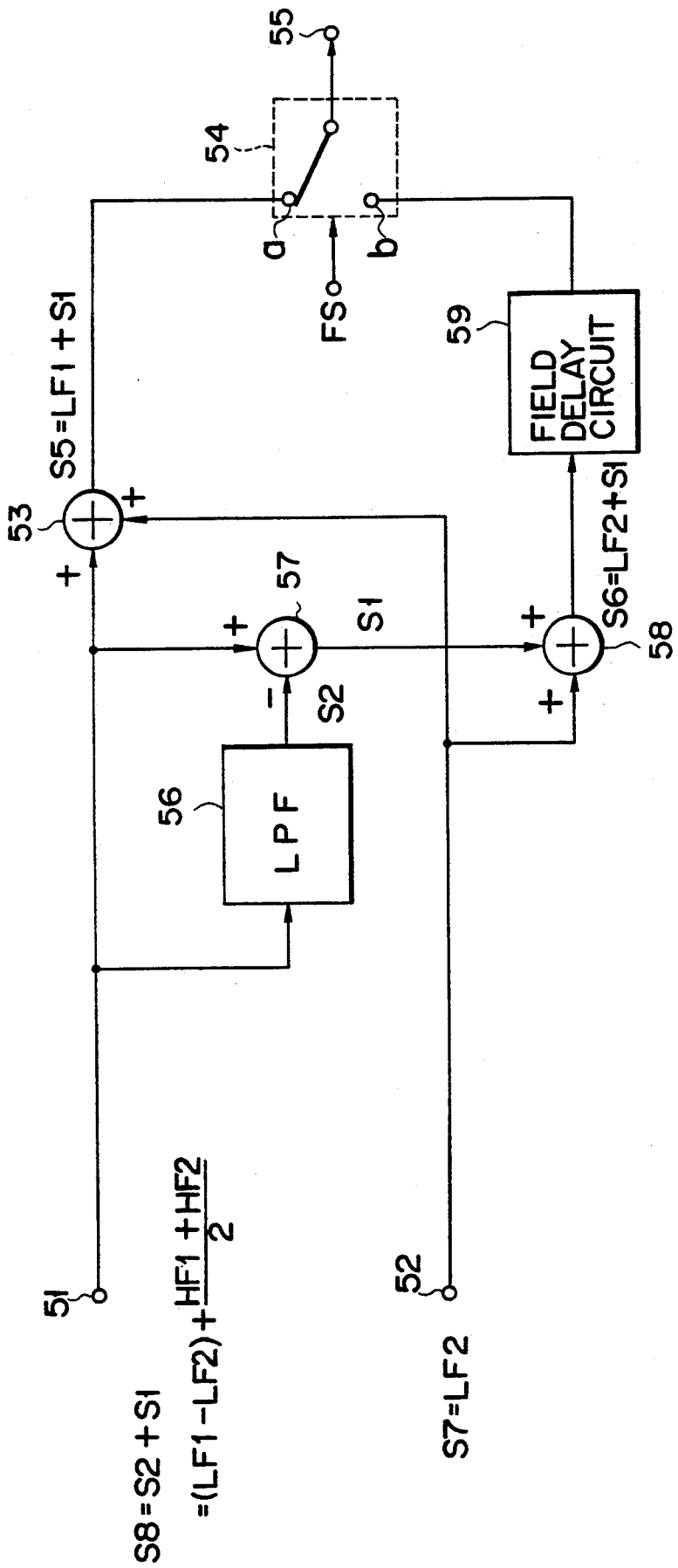
FIG. 12 is a circuit diagram showing an arrangement of a restoration side of the second embodiment of the band compressing/restoring apparatus according to the present invention.

FIG. 11 is a circuit diagram showing an arrangement of a compression side of the second embodiment of the present invention. FIG. 12 is a circuit diagram showing an arrangement of a restoration side of this embodiment.

In the first embodiment, the low- and high-frequency components L and H included in the signal $S_4$, one of the band-compressed outputs, having a small energy are alternately output in units of fields.

In the second embodiment, the low- and high-frequency components L and H included in a signal having a small energy are simultaneously output in the same field.

The band compressing apparatus shown in FIG. 11 will be described below.

Note that in FIG. 11, the same reference numerals as in FIG. 1 denote the same parts and a detailed description thereof will be omitted.

Referring to FIG. 11, a switch circuit 41 is connected to a terminal a in a field in which a low-frequency component $LF_1$ of a first field $F_1$ is output from an LPF 12. As a result, the component $LF_1$ is supplied to a field delay circuit 42 via the switch circuit 41. The circuit 42 delays the component $LF_1$ by one field and supplies it to an adder 43.

The switch circuit 41 is connected to a terminal b in a field in which a low-frequency component $LF_2$ is output from the LPF 12. As a result, the component $LF_2$ is supplied to the adder 43 and output terminal 44.

The adder 43 subtracts the low-frequency component $LF_2$ from the low-frequency component $LF_1$ delayed by one field by the field delay circuit 42, thereby obtaining an in-frame differential signal $S_2$. In this manner, the in-frame differential signal $S_2$ is output in the same field as an in-frame average signal $S_1$ output from an in-frame average circuit 14.

Figure 13A:
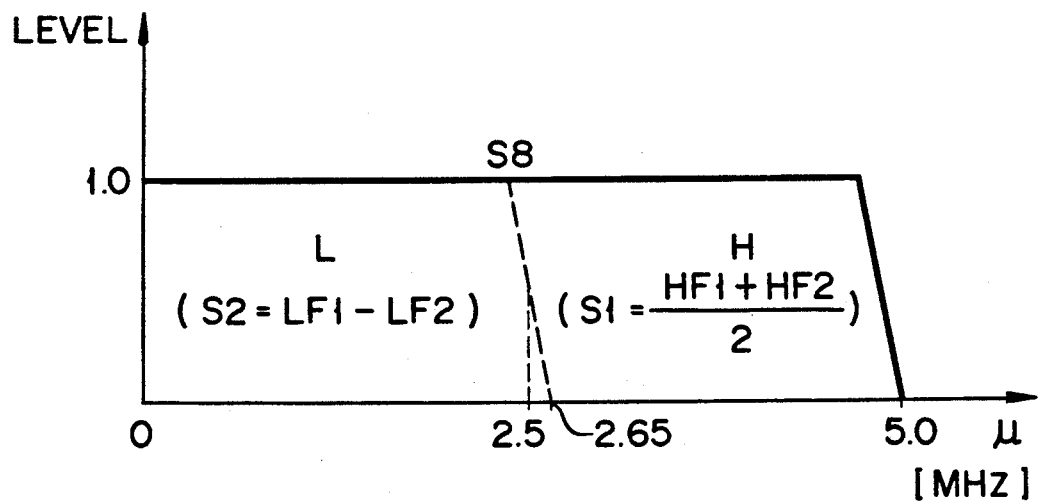
FIGS. 13A and 13B are graphs showing frequency characteristics for explaining an operation of the arrangements in FIGS. 11 and 12.

The in-frame differential signal $S_2$ and the in-frame average signal $S_1$ are added to each other by an adder 45. As a result, a signal $S_8$ having a small energy is obtained and output from an output terminal 46. This signal $S_8$ is shown in FIG. 13A.

Figure 13B:
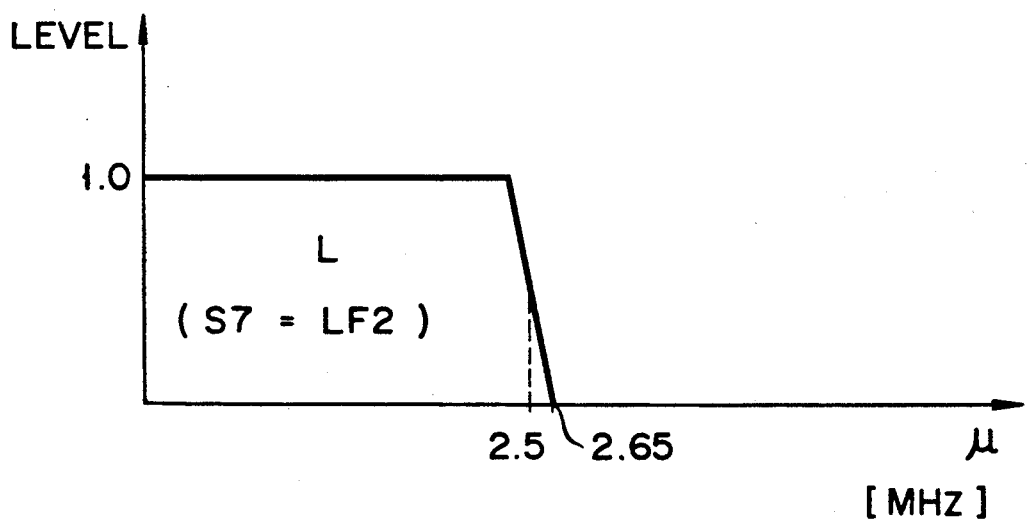

The low-frequency component $LF_2$ is output as a signal $S_7$ having a large energy from an output terminal 44. This signal $S_7$ is shown in FIG. 13B. Note that the signals $S_7$ and $S_8$ are output in the same field.

The arrangement of the band restoring apparatus shown in FIG. 12 will be described below.

This band restoring apparatus is the same as the band restoring apparatus shown in FIG. 2 in that band-compressed outputs are restored to signals $S_5$ and $S_6$.

The band restoring apparatus shown in FIG. 12, however, does not require the adder 33 and the switch circuit 34 of the band restoring apparatus shown in FIG. 2. This is because the signals $S_1$ and $S_2$ having small energy and signal $S_7$ having large energy are beforehand separated.

The apparatus shown in FIG. 12 will be described in detail below.

Referring to FIG. 12, reference numerals 51 and 52 denote input terminals for receiving the signals $S_7$ and $S_8$, respectively.

The signal $S_8$ is added to the signal $S_7$ by an adder 53. As a result, a signal $S_5$ is obtained. The signal $S_5$ is supplied to a terminal a of a switch circuit 54.

The switch circuit 54 is connected to the terminal a in a field in which the signal $S_5$ is output from the adder 53. As a result, the signal $S_5$ is supplied to an output terminal 55 via the switch circuit 54.

The signal $S_8$ is supplied to an LPF 56 and an adder 57. The LPF 56 extracts a low-frequency component L, i.e., an in-frame differential signal $S_2$ from the signal $S_8$. The adder 57 subtracts the in-frame differential signal $S_2$ from the signal $S_8$. As a result, an in-frame average signal $S_1$ is obtained.

The in-frame average signal $S_1$ is supplied to an adder 58 and added to the signal $S_7$. As a result, a signal $S_6$ is obtained. The signal $S_6$ is delayed by one field with respect to the signal $S_5$ by a field delay circuit 59 and supplied to the switch circuit 54. The switch circuit 54 is connected to a terminal b in a field in which the signal $S_6$ is output from the field delay circuit 59. As a result, the signal $S_6$ is supplied to the output terminal 59 via the switch circuit 54.

In this embodiment, although not described in detail, the same effects as in the first embodiment can be obtained.

Figure 15:
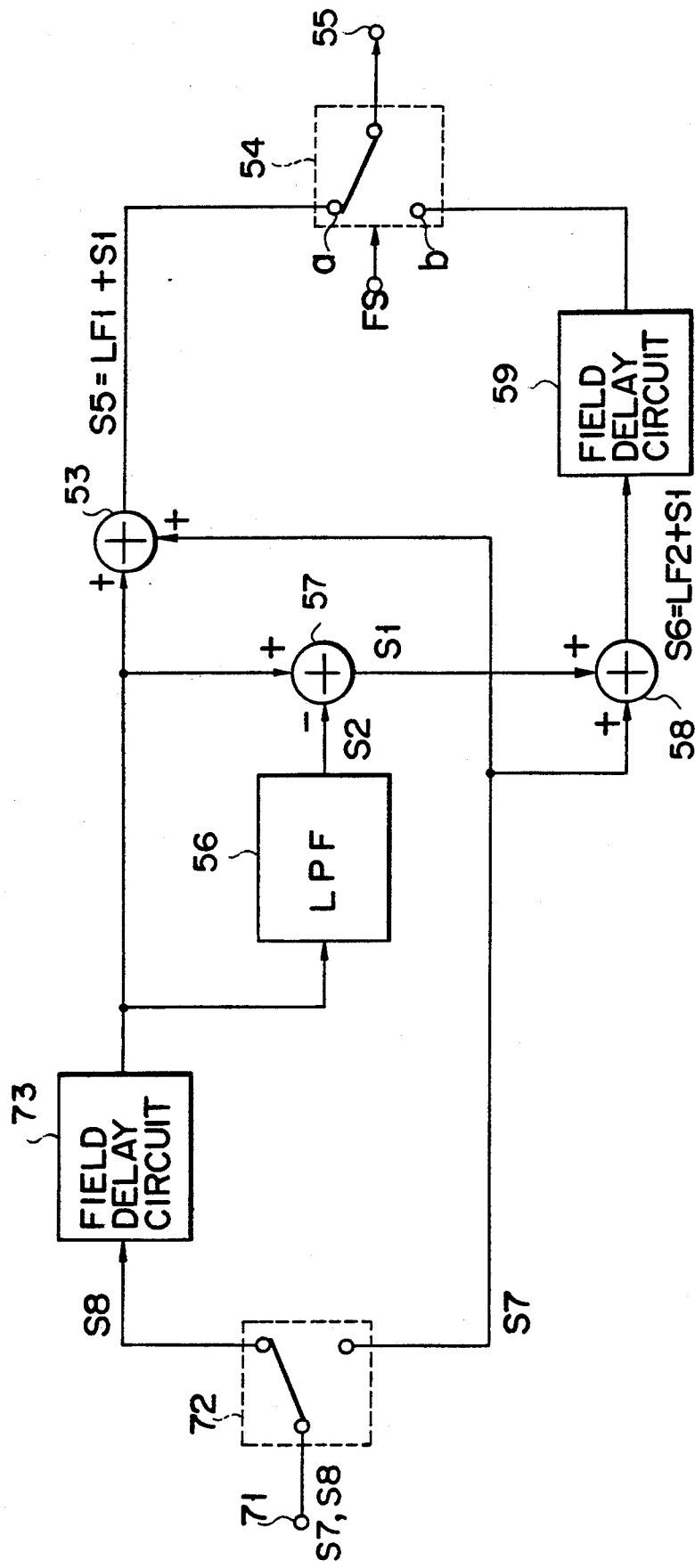
FIG. 15 is a circuit diagram showing an arrangement of a restoration side of the third embodiment of the band compressing/restoring apparatus according to the present invention.

FIG. 14 is a circuit diagram showing an arrangement of a compression side of the third embodiment of the present invention. FIG. 15 is a circuit diagram showing a restoration side of this embodiment.

In the above second embodiments, the signals $S_7$ and $S_8$ are separately transmitted. In the third embodiment, the signals $S_7$ and $S_8$ are transmitted through a single signal line.

That is, in FIG. 14, the signal $S_7$ is delayed by one field by a field delay circuit 61 and supplied to a switch circuit 62. This switch circuit 62 is further supplied with the signal $S_8$. The switch circuit 62 alternately selects the two signals $S_7$ and $S_8$ in units of fields and supplied the selected signal to output terminal 63.

The signal supplied to the output terminal 63 is supplied to a switch circuit 72 via an input terminal 71 of restoring apparatus shown in FIG. 14. This switch circuit 72 separates an input signal to the signals $S_7$ and $S_8$. The rest process is the same as that shown in FIG. 12 except that the signal $S_8$ is positioned on the same field as the signal $S_7$ due to the fact that the signal $S_8$ is delayed by one field by the field delay circuit 73.

The three embodiments of the band compressing/restoring apparatus of the present invention have been described in detail above. An additional signal multiplexing/restoring apparatus utilizing the band compressing/restoring apparatus for band compression of an additional signal will be described below.

FIG. 16 is a block diagram showing an arrangement of a multiplexing side of an embodiment of the additional signal multiplexing/restoring apparatus. FIG. 17 is a block diagram showing an arrangement of a restoring side of the embodiment.

Referring to FIG. 16, reference numeral 81 denotes a main signal generator for generating a main signal, and reference numeral 82 denotes an additional signal generator for generating an additional signal.

An additional signal output from the additional signal generator 82 is band-compressed by a band compressing circuit 83. The circuit 83 has, e.g., the same arrangement as the band compressing apparatus shown in FIG. 1. That is, the band compressing circuit 83 band-compresses the additional signal and outputs signals $S_3$ and $S_4$. The signal $S_4$ is supplied to a frequency multiplexer 84 and frequency-multiplexed with a main signal.

The signal $S_3$ is supplied to an overscan region multiplexer 85 and multiplexed with an overscan region of the main signal output from the frequency multiplexer 84. This multiplexed signal is output from an output terminal 86.

The additional signal restoring apparatus shown in FIG. 17 will be described below.

Referring to FIG. 17, reference numeral 91 denotes an input terminal for receiving a multiplexed signal. The multiplexed signal is supplied to a region separator 92 and separated into the signal $S_3$ and the main signal. Note that the main signal is frequency-multiplexed with the signal $S_4$.

The main signal is supplied to a frequency separator 93 and separated into the signal $S_4$ and the main signal. The main signal is output from an output terminal 94. The signal $S_4$ is supplied together with the signal $S_3$ to a band restoring circuit 95 and band-restored to the original additional signal. This restored output is output from an output terminal 96. The band restoring circuit 95 has, e.g., the same arrangement as the band restoring apparatus shown in FIG. 2.

According to the embodiment described in detail above, since an energy of the signal $S_4$ to be frequency-multiplexed with the main signal is small, almost no interference of the signal $S_4$ with respect to the main signal occurs.

In addition, of the additional signal, since the signal $S_3$ having a larger energy is multiplexed with the overscan region of the main signal, an interference of the signal $S_3$ does not appear on a display screen.

Furthermore, since the additional signal is band-compressed/restored by the band compressing circuit 83 and the band restoring circuit 95 similar to the band compressing/restoring apparatus shown in FIGS. 1 and 2, band compression/restoration is performed so as not to cause unnaturalness of a motion or a decrease in horizontal resolution.

Figure 18B:
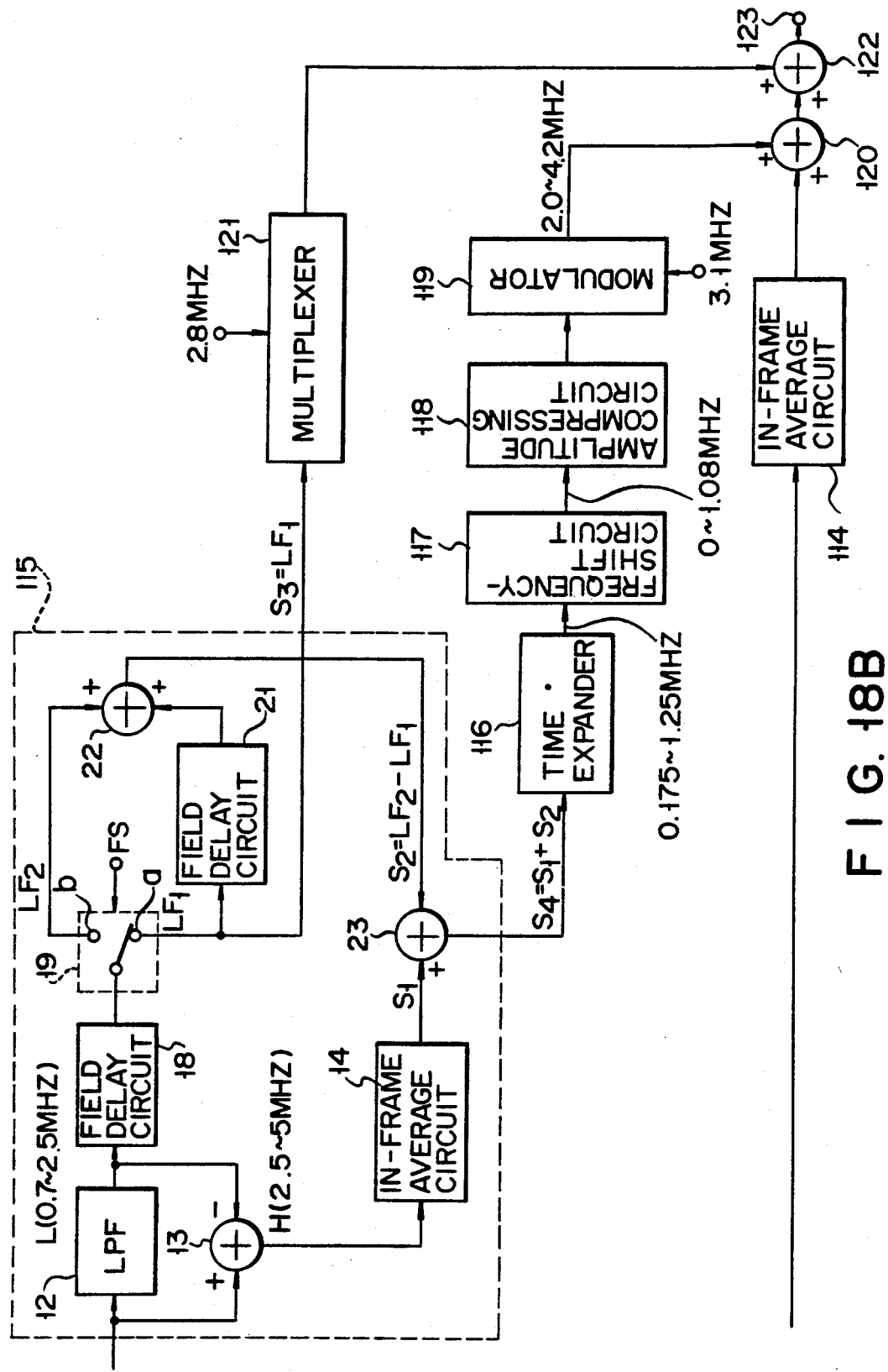

FIGS. 18A and 18B are block diagrams showing an arrangement in which the additional signal multiplexing apparatus shown in FIG. 16 is applied to the ACTV type additional signal multiplexing apparatus described above.

Referring to FIG. 18A, reference numeral 101 denotes wide aspect signal generator. A wide aspect signal output from the generator 101 is a non-interlace signal having 525 scanning lines and a aspect ratio of 5:3. This non-interlace signal is output as R, G, and B primary color signals. The R, G, and B signals are converted into Y, I, and Q signals by a matrix circuit 102. After unnecessary components are removed from the Y, I, and Q signals by vertical-time direction prefilters 103, 104, and 105, respectively, the Y, I, and Q signals are converted into 2:1 interlace format signals by interlace converters 106, 107, and 108, respectively. The interlace signals of the Y, I, and Q signals are divided into center panel signals (main signals) for displaying a screen central portion and side panel signals (additional signals) for displaying two screen side portions by 4:3 converters 109, 110, and 111, respectively. In this case, a component of 0 to 0.7 MHz of the side panel signal is time-compressed and multiplexed with a horizontal overscan region.

The center panel signal multiplexed with the 0- to 0.7-MHz side panel signal is converted into an NTSC signal by a center panel NTSC encoder 112. This NTSC signal is in-frame-averaged by an in-frame average circuit 114 shown in FIG. 18B. Note that this in-frame average operation is performed for only components having horizontal frequencies higher than 1.5 MHz. An empty region is produced by this in-frame average operation, and a part of a 0.7- to 5.0-MHz side panel signal to be described later is frequency-multiplexed with this region.

A 0.7- to 5.0-MHz component of the side panel signal is converted into an NTSC signal by a side panel NTSC encoder 113 shown in FIG. 18A. This NTSC signal is band-compressed by a band compressing circuit 115 shown in FIG. 18B. The circuit 115 has substantially the same arrangement as the band compressing apparatus shown in FIG. 1. Therefore, in the circuit 115, the same reference numerals as in FIG. 1 denote the same parts.

Figure 19A:
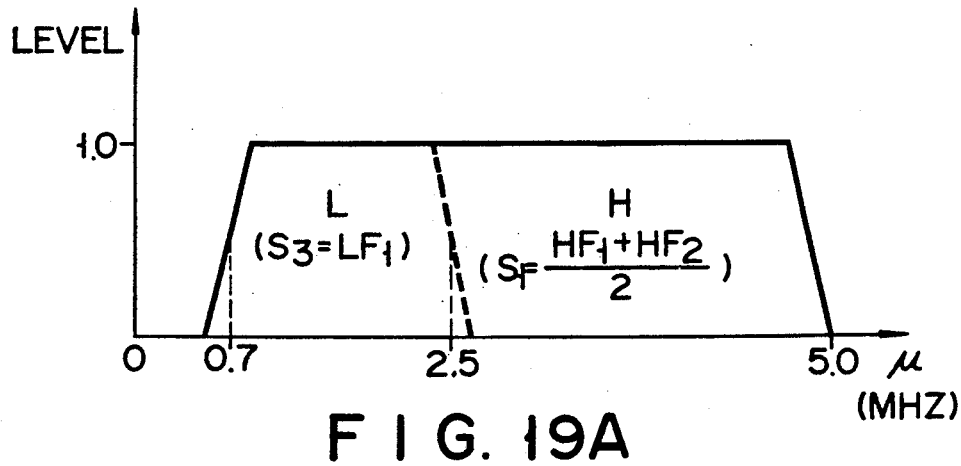
FIGS. 19A and 19B are graphs showing frequency characteristics for explaining operations of the arrangements in FIGS. 18A and 18B.
Figure 19B:
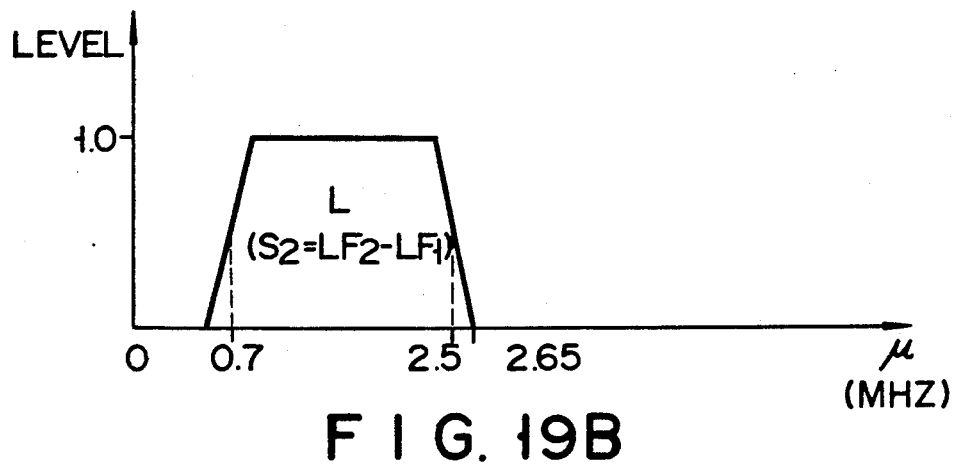

The 0.7- to 5-MHz side panel signal output from the NTSC encoder 113 is separated into a low-frequency component L of 0.7 to 2.5 MHz and a high-frequency component H of 2.5 to 5 MHz by an LPF 12 and an adder 13. A band-compressed output consisting of signals $S_3$ and $S_4$ is obtained on the basis of these separated outputs. Spectrums of the band-compressed output are shown in FIGS. 19A and 19B.

The signal $S_4$ is time-expanded by four by a time expander 116. As a result, a signal having an aspect ratio of 4:3 and a horizontal band of 0.175 to 1.25 MHz is obtained. This signal is frequency-shifted to a low-frequency region by a frequency-shift circuit 17. As a result, a signal having a horizontal band of 0 to 1.08 MHz is obtained. This signal is amplitude-compressed by an amplitude compressing circuit 118. This compressed output is frequency-shifted by a modulator 119 to a region emptied by the in-frame averaging operation of the in-frame average circuit 114. This frequency-shifted output is multiplexed by an adder 20 with the center panel signal output from the in-frame average circuit 114.

The signal $S_3$ is so processed as to be multiplexed with a vertical overscan region of the main signal by a vertical overscan multiplexer 121. The processed output is multiplexed with the vertical overscan region of the center panel signal by an adder 122.

Figure 20:
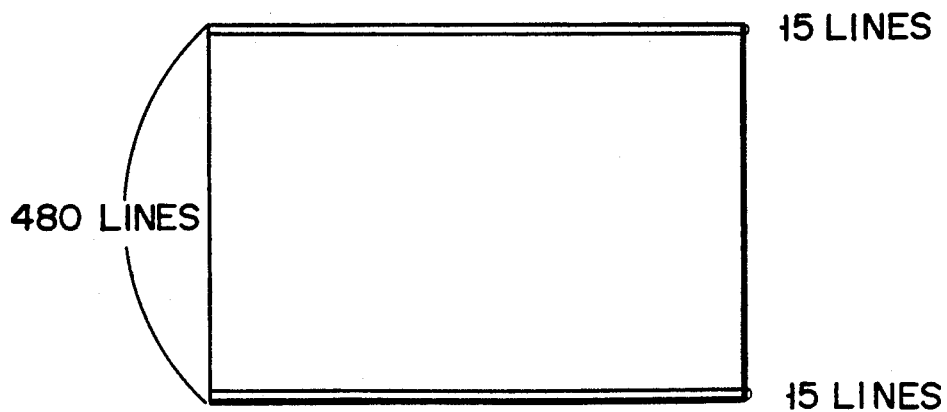
FIG. 20 is a view for explaining the operations of the arrangements in FIGS. 18A and 18B.

FIG. 20 is a view for explaining the multiplexed region of the signal $S_3$. The signal $S_3$ has a band substantially half the original horizontal transmission band. For this reason, in order to multiplex the signal $S_3$, 15 upper and 15 lower scanning lines of 525 scanning lines per frame may be used. The scanning lines in this number correspond to about 6.25% of 480 effective scanning lines. Therefore, the above multiplexed region corresponds to an overscan region in a general television receiver and therefore practically does not interfere with a display screen.

The center panel signal multiplexed with the side panel signal is transmitted from a transmission section (not shown) connected to an output terminal 123 to a reception side.

Figure 21:
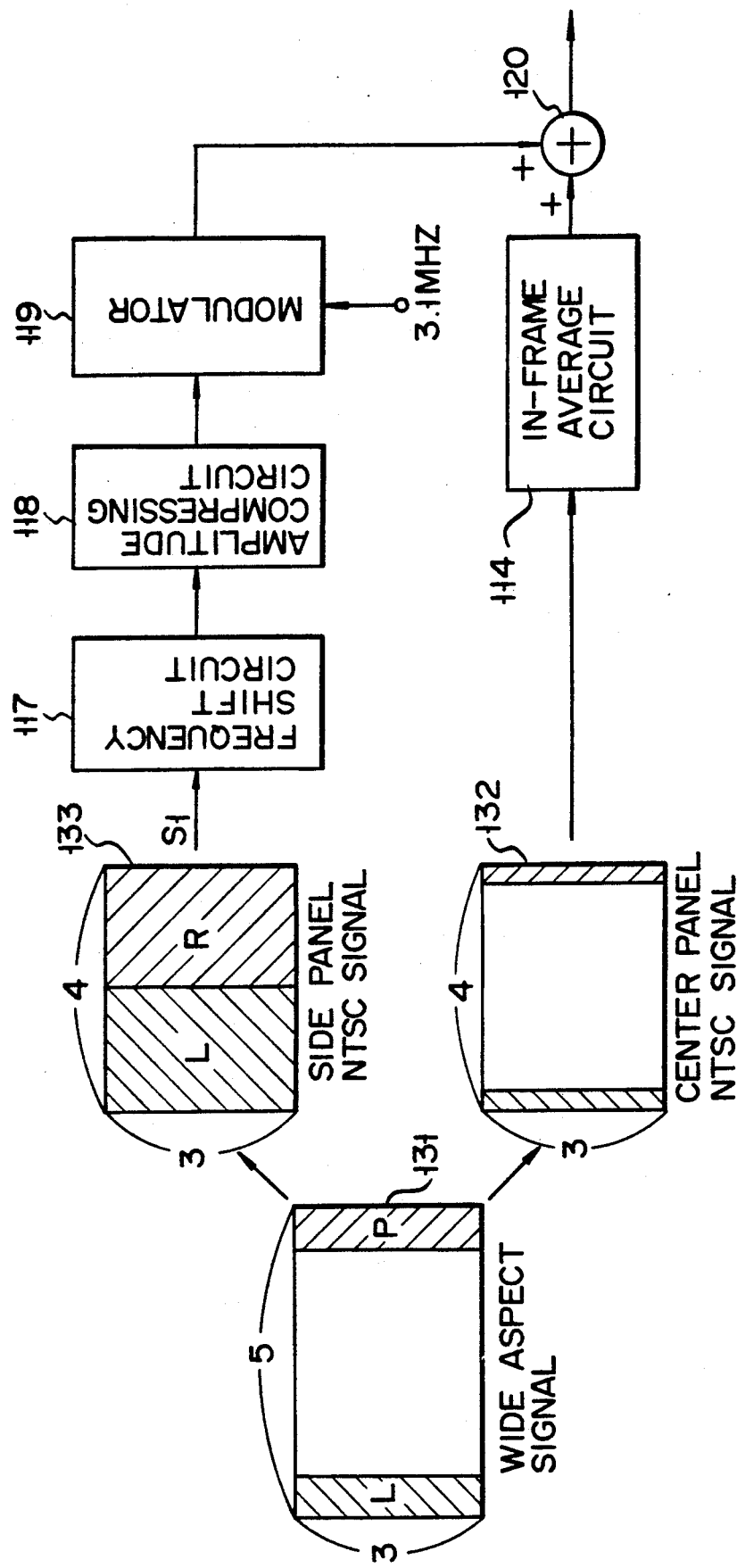
FIG. 21 is a view for explaining the operations of the arrangements in FIGS. 18A and 18B.

FIG. 21 is a view showing the signals of the respective sections shown in FIGS. 18A and 18B.

Referring to FIG. 21, reference numeral 131 denotes a signal having an aspect ratio of 5:3 output from a wide aspect signal generator 41. Of the signal 131, hatched portions represent side panel signals, and the other portion represents a center panel signal.

Reference numeral 132 denotes a center panel signal having an aspect ratio of 4:3 output from the 4:3 converters 109, 110, and 111. Of the signal 132, hatched portions represent 0- to 0.7-MHz side panel signals multiplexed with horizontal overscan portions.

Reference numeral 133 denotes a 0.7- to 5.0-MHz side panel signal converted into a signal having an aspect ratio of 4:3 by the time expander 116.

The signal 132 is in-frame-averaged for components higher than 1.5 MHz by the in-frame average circuit 114 and supplied to the adder 120. The signal 133 is positioned in the empty region described above by the frequency shift circuit 117, the amplitude compressing circuit 118, and the modulator 119 and multiplexed with the center panel signal.

FIGS. 22A to 22E are views showing signal spectrums of the respective sections shown in FIGS. 18A and 18B.

Figure 22A:
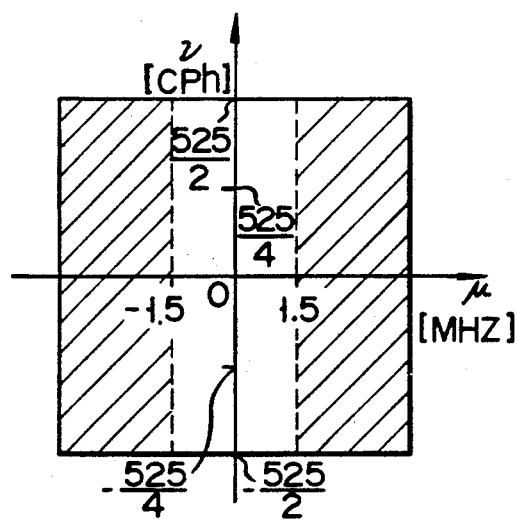
FIGS 22A to 22E are diagrams showing two-dimensional spectrums for explaining the operations of the arrangements in FIGS. 18A and 18B.

FIG. 22A shows a two-dimensional spectrum in horizontal and vertical directions of the center panel signal output from the NTSC encoder 112. Referring to FIG. 22A, hatched portions represent the components higher than 1.5 MHz to be in-frame-averaged by the in-frame average circuit 114.

Figure 22B:
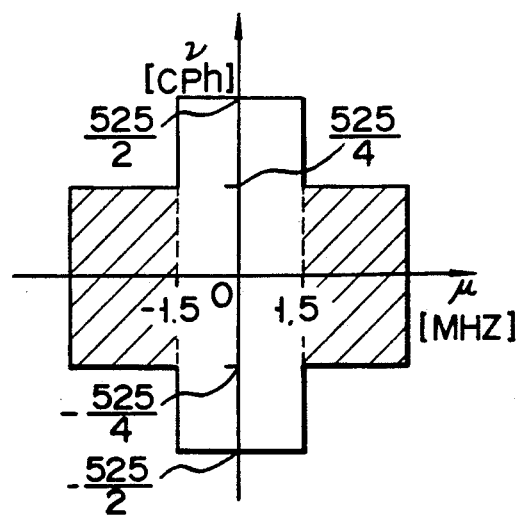

FIG. 22B shows a two-dimensional spectrum in horizontal and vertical directions of the center panel signal in-frame-averaged by the in-frame average circuit 114. As shown in FIG. 22B, a vertical band is band-limited to 525/4 [cph] in a region higher than 1.5 MHz.

Figure 22C:
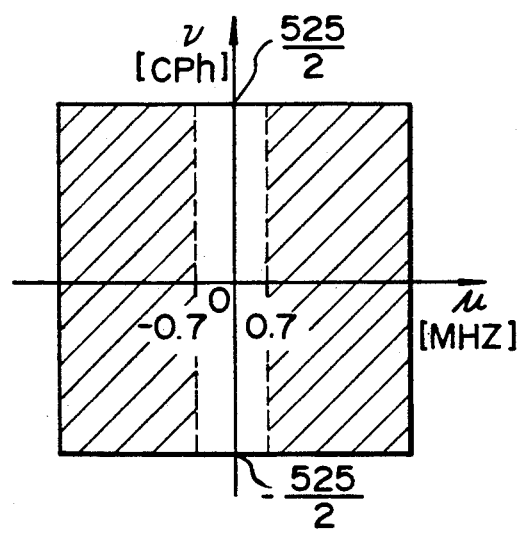

FIG. 22C shows a two-dimensional spectrum in horizontal and vertical directions of the side panel signal output from the side panel NTSC encoder 113. Referring to FIG. 21C, hatched portions represent the components of 0.7 to 5.0 MHz output from the NTSC encoder 113, and the other portion represents the component of 0 to 0.7 MHz to be multiplexed in the horizontal overscan region of the center panel signal.

Figure 22D:
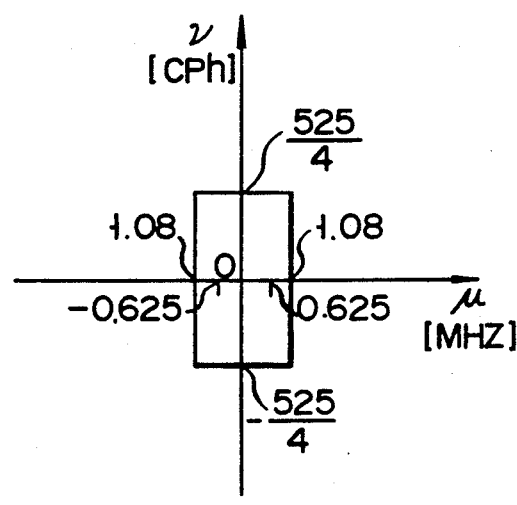

FIG. 22D shows a two-dimensional spectrum in horizontal and vertical directions of the signal $S_4$ output from the frequency-shift circuit 117. As shown in FIG. 22D, the vertical band of the signal $S_4$ is limited to 525/4 [cph].

Figure 22E:
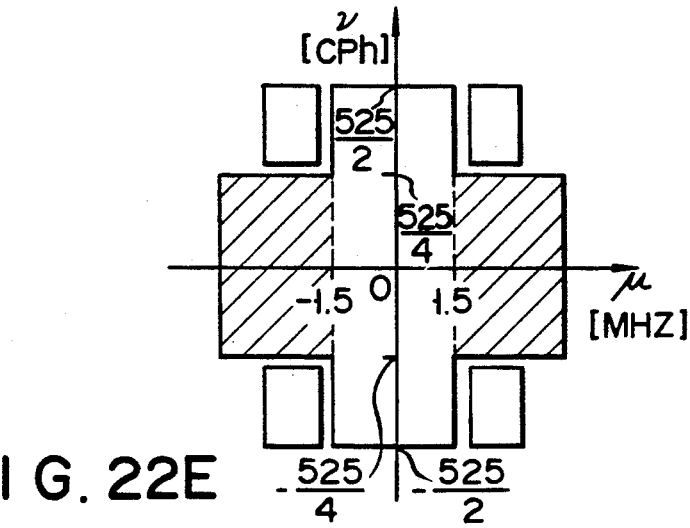

The signal shown in FIG. 22D is multiplexed with the center panel signal by using the region emptied by the in-frame average operation as shown in FIG. 22E.

The arrangement in which the additional signal multiplexing apparatus of the present invention is applied to the ACTV type additional signal multiplexing apparatus has been described above.

Band compression of the present invention is not utilized for band compression of the center panel signal because the center panel signal is a signal for maintaining compatibility with the current NTSC system. Therefore, if the center panel signal need not be used to maintain the compatibility with the current NTSC system, this signal can also be band-compressed by the band compressing apparatus of the present invention.

The embodiments of the present invention have been described above, but the present invention is not limited to these embodiments.

For example, in the above embodiments, the upper-limit frequency of the low-frequency component L is set to be 2.5 MHz. The upper-limit frequency, however, may be set to another frequency.

In addition, in the above embodiments, the in-frame average signal $S_1$ is used as the high-frequency component H. This high-frequency component, however, need only include a high-frequency component H of at least one field.

The present invention can be variously modified and carried out without departing from the spirit and scope of the invention.

According to the present invention as described above, a television signal can be band-compressed without causing unnaturalness of a motion or decreasing a vertical resolution.

In addition, a band-compressed output suitable for frequency multiplexing can be obtained.

What is claimed is:

1. A band compressing and restoring apparatus for compressing an input television signal, having first and second fields, to generate a band compressed signal, and for restoring the band compressed signal, the apparatus comprising:

first signal output means for receiving the input television signal, having a 2:1 interlace format, and for outputting a first television signal, every second field, comprising an average of high frequency components of the first and second fields of the input television signal;

second signal output means for receiving the input television signal and for outputting a second television signal, every first field, obtained by subtracting a low-frequency component of the first field of the input television signal from a low-frequency component of the second field of the input television signal;

third signal output means for receiving the input television signal and for outputting a third television signal, every second field, comprising only the low-frequency components of the first field of the input television signal;

fourth signal output means for receiving the first and second television signals and for outputting a fourth television signal comprising the second television, every first field, and the first television signal, every second field;

fifth signal output means for receiving the third and fourth television signals and for outputting, every second field, a fifth television signal comprising the sum of the third television signal and the second field of the fourth signal;

sixth signal output means for receiving the fourth and fifth television signals, for delaying the fifth television signal by one field, for adding the first field of the fourth television signal to the fifth television signal, and for outputting, every first field, a sixth television signal comprising the sum of the low frequency component of the second field of the input television signal and the first television signal; and seventh signal output means for alternately selecting, every field, the fifth and sixth television signals, respectively, and for outputting a seventh television signal comprising, in a first field thereof, the sum of the low frequency component of the first field of the input television signal and the average of the high frequency components of the first and second field of the input television signal and, in a second field thereof, the sum of the low frequency component of the second field of the input television signal and the average of the high frequency components of the first and second fields of the input television signal.

2. A band compressing apparatus for compressing an input television signal having first and second fields to generate a band compressed signal, the apparatus comprising:

first signal output means for receiving the input television signal, having a 2:1 interlace format, and for outputting a first television signal, every second field, comprising an average of high frequency components of the first and second fields of the input television signal;

second signal output means for receiving the input television signal and for outputting a second television signal, every first field, obtained by subtracting a low-frequency component of the first field of the input television signal from a low-frequency component of the second field of the input television signal;

third signal output means for receiving the input television signal and for outputting a third television signal, every second field, comprising only the low-frequency component of the first field of the input television signal; and fourth signal output means for receiving the first and second television signals and for outputting a fourth television signal comprising the second television, every first field, and the first television signal, every second field.

3. A television signal restoring apparatus for receiving a third television signal including, in a second field, a low frequency component of a first field of an input television signal to be transmitted and, in a first field, no signal; and a fourth television signal having, in the second field, a first television signal comprising an average of high frequency components of first and second fields of the input television signal to be transmitted and, in the first field, a second television signal, obtained by subtracting the low-frequency component of the first field of the input television signal from a low-frequency component of the second field of the input television signal, the apparatus comprising:

fifth signal output means for receiving the third and fourth television signals and for outputting, every second field, a fifth television signal comprising the sum of the third television signal and the second field of the fourth signal;

sixth signal output means for receiving the fourth and fifth television signals, for delaying the fifth television signal by one field, for adding the first field of the fourth television signal to the delayed fifth television signal, and for outputting, every first field, a sixth television signal comprising the sum of the low frequency component of the second field of the input television signal and first television signal; and seventh signal output means for alternately selecting, every field, the fifth and sixth television signals, respectively, and for outputting a seventh television signal comprising, in a first field thereof, the sum of the low frequency component of the first field of the input television signal and the average of the high frequency components of the first and second fields of the input television signal and, in a second field thereof, the sum of the low frequency component of the second field of the input television signal and the average of the high frequency components of the first and second fields of the input television signal.

4. A band compressing and restoring apparatus for compressing an input television signal having first and second fields to generate a band compressed signal, and for restoring the band compressed signal, the apparatus comprising:

first signal output means for receiving the input television signal, having a 2:1 interlace format, and for outputting a first television signal, every second field, comprising an average of high frequency components of the first and second fields of the input television signal;

second signal output means for receiving the input television signal and for outputting a second television signal, every second field, obtained by subtracting a low-frequency component of the second field of the input television signal from a low-frequency component of the first field of the input television signal;

third signal output means for receiving the input television signal and for outputting a third television signal, every second field, comprising only the low-frequency component of the second field of the input television signal;

fourth signal output means for receiving the first and second television signals and for outputting, every second field, a fourth television signal comprising the sum of the first and second television signals;

fifth signal output means for receiving the third and fourth television signals and for outputting, every second field, a fifth television signal comprising the sum of the third television signal and the fourth television signal, the sum including the low frequency component of the first field of the input television signal and the first television signal;

sixth signal output means for receiving the third and fourth television signals, for canceling the second television signal included in the fourth television signal to extract the first television signal, for adding the extracted first television signal to the third television signal to provide a sixth television signal, for delaying the sixth television signal by one field and for outputting, every first field, the sixth television signal; and seventh signal output means for alternately selecting, every field, the fifth and sixth television signals, respectively, and for outputting a seventh television signal comprising, in a first field thereof, the sum of the low frequency component of the first field of the input television signal and the average of the high frequency components of the first and second fields of the input television signal and, in a second field thereof, the sum of the low frequency component of the second field of the input television signal and the average of the high frequency components of the first and second fields of the input television signal.

5. A band compressing apparatus for compressing an input television signal having first and second fields to generate a band compressed signal, the apparatus comprising:

first signal output means for receiving the input television signal, having a 2:1 interlace format, and for outputting a first television signal, every second field, comprising an average of high frequency components of the first and second fields of the input television signal;

second signal output means for receiving the input television signal and for outputting a second television signal, every second field, obtained by subtracting a low-frequency component of the second field of the input television signal from a low-frequency component of the first field of the input television signal;

third signal output means for receiving the input television signal and for outputting a third television signal, every second field, comprising only the low-frequency component of the second field of the input television signal; and fourth signal output means for receiving the first and second television signals and for outputting, every second field, a fourth television signal comprising the sum of the first and second television signals.

6. A television signal restoring apparatus for receiving a third television signal including, in a second field, only a low frequency component of a second field of an input television signal to be transmitted, and for receiving a fourth television signal having, in the second field, the sum of a first television signal, comprising an average of high frequency components of first and second fields of the input television signal to be transmitted, and a second television signal, obtained by subtracting a low-frequency component of the second field of the input television signal from the low-frequency component of the first field of the input television signal, the apparatus comprising:

fifth signal output means for receiving the third and fourth television signals and for outputting, every second field, a fifth television signal comprising the sum of the third television signal and fourth signal which includes the low frequency component of the first field of the input television signal and the first television signal;

sixth signal output means for receiving the third and fourth television signals, for canceling the second television signal included in the fourth television signal thereof, for adding the extracted first television signal to the third television signal to obtain a sixth television signal, for delaying the sixth television signal by one field and for outputting, every first field, the sixth television; and seventh signal output means for alternately selecting, every field, the fifth and sixth television signals, respectively, and for outputting a seventh television signal comprising, in a first field thereof, the sum of the low frequency component of the first field of the input television signal and the average of the high frequency components of the first and second fields of the input television signal and, in a second field thereof, the sum of the low frequency component of the second field of the input television signal and the average of the high frequency components of the first and second fields of the input television signal.

7. A band compressing and restoring apparatus for compressing an input television signal, having first and second fields, to generate a band compressed signal, and for restoring the band compressed signal, the apparatus comprising:

first signal output means for receiving the input television signal, having a 2:1 interlace format, and for outputting, every second field, a first television signal comprising an average of high frequency components of the first and second fields of the input television signal;

second signal output means for receiving the input television signal and for outputting, every second field, a second television signal obtained by subtracting a low-frequency component of the second field of the input television signal from a low-frequency component of the first field of the input television signal;

third signal output means for receiving the input television signal and for outputting a third television signal, every first field, comprising only the low-frequency component of the second field of the input television signal;

fourth signal output means for receiving the first and second television signals and for outputting, every second field, a fourth television signal comprising the sum of the first and second television signals;

means for receiving the third and fourth television signals and for transmitting a transmission television signal comprising the third television signal in the first field and the fourth television signal in the second field;

separating means for receiving the transmission signal and for separating the third television signal of the first field thereof and for separating and delaying, by one field, the fourth television signal of the second field thereof;

fifth signal output means for receiving and for adding the third television signal and the delayed fourth television signal and for outputting, every first field, a fifth television signal comprising the sum of the third television signal and the fourth television signal, the fifth television signal comprising the low frequency component of first field of the input television signal and first television signal included in the fourth television signal;

sixth signal output means for receiving the third and fourth television signals, for canceling the second television signal included in the fourth television signal and for extracting the first television signal thereof, for adding the extracted first television signal and the third television signal to obtain a sixth television signal, for delaying the sixth television signal by one field, and for outputting, every second field, the sixth television signal comprising the sum of the low frequency component of the second field of the input television signal and first television signal; and means for alternately selecting, every field, the fifth and sixth television signals, respectively, and for outputting a seventh television signal comprising, in one field thereof, the sum of the low frequency component of the first field of the input television signal and the average of the high frequency components of the first and second fields of the input television signal and, in another field thereof, the sum of the low frequency component of the second field of the input television signal and the average of the high frequency components of the first and second fields of the input television signal.

8. A band compressing apparatus for compressing an input television signal, having first and second fields, to generate a band compressed signal, the apparatus comprising:

first signal output means for receiving the input television signal, having a 2:1 interlace format, and for outputting, every second field, a first television signal comprising an average of high frequency components of the first and second fields of the input television signal;

second signal output means for receiving the input television signal and for outputting, every second field, a second television signal obtained by subtracting a low-frequency component of the second field of the input television signal from a low-frequency component of the first field of the input television signal;

third signal output means for receiving the input television signal and for outputting a third television signal, every first field, comprising only the low-frequency component of the second field of the input television signal;

fourth signal output means for receiving the first and second television signals and for outputting, every second field, a fourth television signal comprising the sum of the first and second television signals;

means for receiving the third and fourth television signals and for transmitting a transmission television signal comprising the third television signal in the first field and the fourth television signal in the second field.

9. A television signal restoring apparatus for receiving a transmission television signal having, in a first field thereof, a third television signal including a low frequency component of a second field of an input television signal to be transmitted and, in a second field thereof, a fourth television signal comprising the sum of a first television signal, comprising an average of high frequency components of first and second fields of the input television signal to be transmitted, and a second television signal, obtained by subtracting the low-frequency component of the second field of the input television signal from a low-frequency component of the first field of the input television signal, the apparatus comprising:

separating means for receiving the transmission signal and for separating the third television signal of the first field thereof and for separating and delaying, by one field, the fourth television signal of the second field thereof;

fifth signal output means for receiving and for adding the third television signal and the delayed fourth television signal and for outputting, every first field, a fifth television signal comprising the sum of the third television signal and the fourth television signal, the fifth television signal comprising the low frequency component of first field of the input television signal and first television signal included in the fourth television signal;

sixth signal output means for receiving the third and fourth television signals, for canceling the second television signal included in the fourth television signal and for extracting the first television signal thereof, for adding the extracted first television signal and the third television signal to obtain a sixth television signal, for delaying the sixth television signal by one field, and for outputting, every second field, the sixth television signal comprising the sum of the low frequency component of the second field of the input television signal and first television signal; and means for alternately selecting, every field, the fifth and sixth television signals, respectively, and for outputting a seventh television signal comprising, in one field thereof, the sum of the low frequency component of the first field of the input television signal and the average of the high frequency components of the first and second fields of the input television signal and, in another field thereof, the sum of the low frequency component of the second field of the input television signal and the average of the high frequency components of the first and second fields of the input television signal.

* * * * *